(12) United States Patent
Mori et al.

(10) Patent No.: US 10,397,874 B2
(45) Date of Patent: Aug. 27, 2019

(54) INFORMATION PROCESSING DEVICE, COMMUNICATION SYSTEM, INFORMATION PROCESSING METHOD, AND PROGRAM

(71) Applicant: SONY CORPORATION, Tokyo (JP)

(72) Inventors: Masahito Mori, Kanagawa (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/544,624

(22) PCT Filed: Dec. 4, 2015

(86) PCT No.: PCT/JP2015/084166
§ 371 (c)(1),
(2) Date: Jul. 19, 2017

(87) PCT Pub. No.: WO2016/139859
PCT Pub. Date: Sep. 9, 2016

(65) Prior Publication Data
US 2018/0007633 A1 Jan. 4, 2018

(30) Foreign Application Priority Data
Mar. 5, 2015 (JP) .................. 2015-043386

(51) Int. Cl.
*H04W 52/02* (2009.01)
*H04M 1/00* (2006.01)
(Continued)

(52) U.S. Cl.
CPC ......... *H04W 52/0261* (2013.01); *H04M 1/00* (2013.01); *H04W 52/02* (2013.01);
(Continued)

(58) Field of Classification Search
CPC ......... H04W 52/0261; H04W 72/0453; H04W 84/12; H04W 72/04; H04W 52/02;
(Continued)

(56) References Cited

U.S. PATENT DOCUMENTS

2008/0002676 A1* 1/2008 Wiley ............... H04L 29/06027
370/356
2008/0292035 A1* 11/2008 Chang .................. H01Q 1/2258
375/347

(Continued)

FOREIGN PATENT DOCUMENTS

JP 2009-89052 A 4/2009
JP 2011-211709 A 10/2011
(Continued)

OTHER PUBLICATIONS

International Search Report dated Mar. 1, 2016 in PCT/JP2015/084166 filed Dec. 4, 2015.

(Continued)

*Primary Examiner* — Mounir Moutaouakil
(74) *Attorney, Agent, or Firm* — Xsensus, LLP

(57) ABSTRACT

An information processing device including a wireless communication section and a control section. The wireless communication section of the information processing device communicates wirelessly with another information processing device using one or multiple channels. The control section of the information processing device performs control to notify the other information processing device of channel information for identifying a channel for use in the wireless communication with the other information processing device using one or multiple channels. Thereby, channels for use in wireless communication can be set appropriately.

7 Claims, 16 Drawing Sheets

(51) Int. Cl.
*H04W 72/04* (2009.01)
*H04W 84/12* (2009.01)
*H04W 24/08* (2009.01)
*H04W 74/08* (2009.01)

(52) U.S. Cl.
CPC ....... *H04W 72/04* (2013.01); *H04W 72/0453* (2013.01); *H04W 84/12* (2013.01); *H04W 24/08* (2013.01); *H04W 74/0816* (2013.01); *Y02D 70/00* (2018.01); *Y02D 70/10* (2018.01); *Y02D 70/14* (2018.01); *Y02D 70/142* (2018.01); *Y02D 70/164* (2018.01); *Y02D 70/166* (2018.01); *Y02D 70/21* (2018.01)

(58) Field of Classification Search
CPC ... H04W 24/08; H04W 74/0816; H04M 1/00; Y02D 70/14; Y02D 70/21; Y02D 70/142; Y02D 70/166; Y02D 70/164; Y02D 70/10; Y02D 70/00
See application file for complete search history.

(56) References Cited

U.S. PATENT DOCUMENTS

| 2009/0086802 | A1 | 4/2009 | Nabetani |
| 2011/0235576 | A1 | 9/2011 | Gong et al. |
| 2012/0082040 | A1 | 4/2012 | Gong et al. |
| 2013/0195036 | A1 | 8/2013 | Quan et al. |
| 2013/0332511 | A1* | 12/2013 | Hala ........................ H04L 67/34 709/203 |
| 2014/0004865 | A1* | 1/2014 | Bhargava .......... H04W 74/0816 455/445 |
| 2014/0086200 | A1 | 3/2014 | Seok |
| 2015/0312874 | A1* | 10/2015 | Das ..................... H04W 60/005 455/435.1 |

FOREIGN PATENT DOCUMENTS

| JP | 2013-543702 A | 12/2013 |
| WO | 2009/154406 A2 | 12/2009 |

OTHER PUBLICATIONS

"IEEE Standard for Information technology-Telecommunications and information exchange between systems Local and metropolitan area networks-Specific requirements; Part 11: Wireless LAN Medium Access Control (MAC) and Physical Layer (PHY) Specifications; Amendment 4: Enhancements for Very High Throughput for Operation in Bands below 6 GHz", IEEE Standards Association, 2013, 425 total pages.

IEEE Standard for Information technology-Telecommunications and information exchange between systems Local and metropolitan area networks-Specific requirements; Part 11: Wireless LAN Medium Access Control (MAC) and Physical Layer (PHY) Specifications, IEEE Standards Association, Mar. 29, 2012, 2793 total pages.

Extended European Search Report received for EP Application No. 15884025.6 dated Oct. 9, 2018, 7 pages.

\* cited by examiner

INFORMATION PROCESSING DEVICE
(SLAVE STATION)
200

TYPICAL FORMAT OF HE Operation element

FIG. 4

| ChNo | 36 | 40 | 44 | 48 | 52 | 56 | 60 | 64 | 100 | 104 | 108 | 112 | 116 | 120 | 124 | 128 | 132 | 136 | 140 | 144 | 149 | 153 | 157 | 161 | 165 | | | | | | | 31 |
|---|---|---|---|---|---|---|---|---|---|---|---|---|---|---|---|---|---|---|---|---|---|---|---|---|---|---|---|---|---|---|---|---|
| | 1 | 0 | 1 | 0 | 1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 0 | 1 | | | | | | | | | | | | | | | | | | | | | | | | | | | | | | |

TYPICAL CHANNELS OPERATED BY MASTER STATION

TYPICAL FORMAT OF RTS FRAME

F I G . 9

|  |  | REMAINING BATTERY LEVEL | | | |
| --- | --- | --- | --- | --- | --- |
|  |  | LESS THAN M1 (LITTLE) | M1 OR MORE AND LESS THAN M2 | M2 OR MORE AND LESS THAN M3 | M3 OR MORE (MUCH) |
| RECEIVED SIGNAL STRENGTH (RSSI) | N3 OR MORE (HIGH) | 1 CHANNEL (20 MHz) | 2 CHANNELS (40 MHz) | 3 CHANNELS (60 MHz) | 4 CHANNELS (80 MHz) |
|  | N2 OR MORE AND LESS THAN N3 | 2 CHANNELS (40 MHz) | 2 CHANNELS (40 MHz) | 3 CHANNELS (60 MHz) | 4 CHANNELS (80 MHz) |
|  | N1 OR MORE AND LESS THAN N2 | 3 CHANNELS (60 MHz) | 3 CHANNELS (60 MHz) | 3 CHANNELS (60 MHz) | 4 CHANNELS (80 MHz) |
|  | LESS THAN N1 (LOW) | 4 CHANNELS (80 MHz) | 4 CHANNELS (80 MHz) | 4 CHANNELS (80 MHz) | 4 CHANNELS (80 MHz) |

FIG. 13

TYPICAL MONITOR TARGET CHANNELS OF SLAVE STATION

| ChNo | 36 | 40 | 44 | 48 | 52 | 56 | 60 | 64 | 100 | 104 | 108 | 112 | 116 | 120 | 124 | 128 | 132 | 136 | 140 | 144 | 149 | 153 | 157 | 161 | 165 | | | | | | | |
|---|---|---|---|---|---|---|---|---|---|---|---|---|---|---|---|---|---|---|---|---|---|---|---|---|---|---|---|---|---|---|---|---|
| | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 0 | 1 | | | | | | | | | | | | | | | | | | | | | | | | | | | | | | 31 |

TYPICAL FORMAT OF MONITOR TARGET CHANNEL NOTIFICATION FRAME

TYPICAL Channel Map FIELD

INFORMATION PROCESSING DEVICE, COMMUNICATION SYSTEM, INFORMATION PROCESSING METHOD, AND PROGRAM

TECHNICAL FIELD

The present technology relates to an information processing device. More particularly, the technology relates to an information processing device, a communication system, and an information processing method for transmitting and receiving information by wireless communication, as well as to a program for causing a computer to execute the information processing method.

BACKGROUND ART

There exist wireless communication technologies for transmitting and receiving information by wireless communication. Also, technologies have been proposed for raising communication rates with a view to speeding up networks. For example, there is a technology called channel bonding for implementing the acceleration of networks. Channel bonding is a technology that bonds multiple channels together to raise the bandwidth and thereby to increase communication rates.

For example, under the Institute of Electrical and Electronic Engineers (IEEE) 802.11, one of the standards regarding wireless local area networks (LANs), two adjacent 20 megahertz (MHz)-wide channels are bonded together to permit communication over a bandwidth of 40 MHz (e.g., see NPL 1).

According to the IEEE 802.11ac, which is a revised version of the IEEE 802.11, communication is made available over bandwidths of 20, 40, and 80 (and 160 as an option) MHz (e.g., see NPL 2). Also according to the IEEE 802.11 and IEEE 802.11ac, one of the individual 20 MHz channels making up the 40, 80, and 160 MHz bandwidths is regarded as the primary channel. The implementation of communication is predicated on using multiple channels including the primary channel.

CITATION LIST

Non-Patent Literatures

[NPL 1]
IEEE STANDARDS ASSOCIATION, "IEEE Std 802.11-2012" [online], [searched on Jan. 30, 2015], <URL: http://standards.ieee.org/getieee802/download/802.11-2012.pdf> on the Internet
[NPL 2]
IEEE STANDARDS ASSOCIATION, "IEEE Std 802.11ac-2013" [online], [searched on Jan. 30, 2015], <URL: http://standards.ieee.org/getieee802/download/802.11ac-2013.pdf> on the Internet

SUMMARY

Technical Problems

If a wireless device places multiple bonded channels in a listening state using the above-mentioned channel bonding technology, the device consumes more power than if it puts only one channel in the listening state. If the listening-state channels are narrowed down, the non-listening-state channels may not be set properly with a packet transmission inhibition period in the form of a network allocation vector (NAV). If the NAV is not established appropriately on a channel, that channel can incur packet collision. In an environment called an overlapping basic service set (OBSS), the primary channel may happen to be operated also in what is known as a basic service set (BSS). If that happens, efficient (i.e., flexible) bandwidth utilization may not be possible.

The present technology has been devised in view of the above circumstances. It is therefore an object of the technology to appropriately set channels for use in wireless communication.

Solution to Problems

In solving the above-outlined problems and according to a first aspect of the present technology, there is provided an information processing device including: a wireless communication section configured to communicate wirelessly with another information processing device using one or multiple channels; and a control section configured to perform control to notify the other information processing device of channel information for identifying a channel for use in the wireless communication. Also provided according to the first aspect of the present technology is an information processing method for use with the information processing device, as well as a program for causing a computer to execute the method. This provides an effect of notifying the other information processing device of channel information for identifying the channel for use in the wireless communication.

Also according to the first aspect of the present technology, the wireless communication section may perform the wireless communication with the other information processing device using channel bonding under the IEEE 802.11 standard. This provides an effect of permitting wireless communication with the other information processing device using channel bonding under the IEEE 802.11 standard.

Also according to the first aspect of the present technology, the control section may perform control to transmit a request-to-send frame including the channel information. This provides an effect of transmitting the request-to-send frame including the channel information.

Also according to the first aspect of the present technology, the control section may perform control to transmit the request-to-send frame on the channel identified by the channel information. This provides an effect of transmitting the request-to-send frame on the channel identified by the channel information.

Also according to the first aspect of the present technology, the control section may perform control to use for the wireless communication a channel used for receiving a clear-to-send frame with regard to the request-to-send frame. This provides an effect of using for the wireless communication the channel used for receiving the clear-to-send frame with regard to the request-to-send frame.

Also according to the first aspect of the present technology, the control section may perform control to transmit a clear-to-send frame including the channel information. This provides an effect of transmitting the clear-to-send frame including the channel information.

Also according to the first aspect of the present technology, the control section may perform control to transmit the clear-to-send frame on the channel identified by the channel information. This provides an effect of transmitting the clear-to-send frame on the channel identified by the channel information.

Also according to the first aspect of the present technology, the channel information may be bit map information indicative of relations of correspondence between multiple channels available for the wireless communication section on the one hand and channels for use in the wireless communication on the other hand. This provides an effect of using the bit map information indicative of the relations of correspondence between multiple channels available for the wireless communication section on the one hand and the channels for use in the wireless communication on the other hand.

According to a second aspect of the present technology, there is provided an information processing device including: a wireless communication section configured to communicate wirelessly with another information processing device using one or multiple channels; and a control section configured to perform control to set a channel for use in the wireless communication on the basis of a notification from the other information processing device. Also provided according to the second aspect of the present technology is an information processing method for use with the information processing device, as well as a program for causing a computer to execute the method. This provides an effect of setting the channel for use in the wireless communication on the basis of the notification from the other information processing device.

Also according to the second aspect of the present technology, the control section may set one or multiple channels as monitor target channels for use in monitoring signals, and, upon receipt of a request-to-send frame including channel information for identifying a channel requested for use in the wireless communication, the control section may set a channel for use in the wireless communication on the basis of a comparison between the channel identified by the channel information and the monitor target channels. This provides an effect of setting the monitor target channels and, upon receipt of the request-to-send frame, of setting the channel for use in the wireless communication on the basis of a comparison between the channel identified by the channel information included in the request-to-send frame and the monitor target channels.

Also according to the second aspect of the present technology, the control section may set a channel for use in the wireless communication on the basis of a remaining battery level and a received signal strength of the information processing device. This provides an effect of setting the channel for use in the wireless communication on the basis of the remaining battery level and received signal strength of the information processing device.

According to a third aspect of the present technology, there is provided a communication system including: a first information processing device including a wireless communication section configured to communicate wirelessly with a second information processing device using one or multiple channels, and a control section configured to perform control to notify the second information processing device of channel information for identifying a channel for use in the wireless communication; and a second information processing device including a wireless communication section configured to communicate wirelessly with the first information processing device using one or multiple channels, and a control section configured to perform control to set a channel for use in the wireless communication on the basis of the notification from the first information processing device. Also provided according to the third aspect of the present technology is an information processing method for use with the communication system, as well as a program for causing a computer to execute the method. This provides an effect of causing the first information processing device to notify the second information processing device of the channel information for identifying the channel for use in the wireless communication, and causing the second information processing device to set the channel for use in the wireless communication on the basis of the notification from the first information processing device.

Advantageous Effect of Invention

The present technology provides an advantageous effect of appropriately setting channels for use in wireless communication. The effects mentioned in this description are only examples and not limitative of the technology. Further advantages will be apparent from a reading of the present disclosure.

BRIEF DESCRIPTION OF DRAWINGS

FIG. 4 is a schematic view depicting typical information about the channels operated by a master station as part of the communication system 10 of the first embodiment of the present technology.

FIG. 9 is a tabular view depicting typical information for use in a monitor target channel adjustment process performed by the information processing device (slave station) 200 of the first embodiment of the present technology.

FIG. 13 is a schematic view depicting typical information about the monitor target channels of a slave station as part of a communication system 10 constituting a second embodiment of the present technology.

DESCRIPTION OF EMBODIMENTS

Described below are the preferred modes for implementing the present technology (called the embodiments hereunder). The description will be given under the following headings:
1. First Embodiment (an example in which a master station notifies a slave station of transmission-requested channels and in which the slave station sets channels for use in data reception based on the content of the notification)
2. Second Embodiment (an example in which the slave station notifies the master station of monitor target channels)
3. Applications 1. First Embodiment (Typical Configuration of Communication System)

Figure 1:
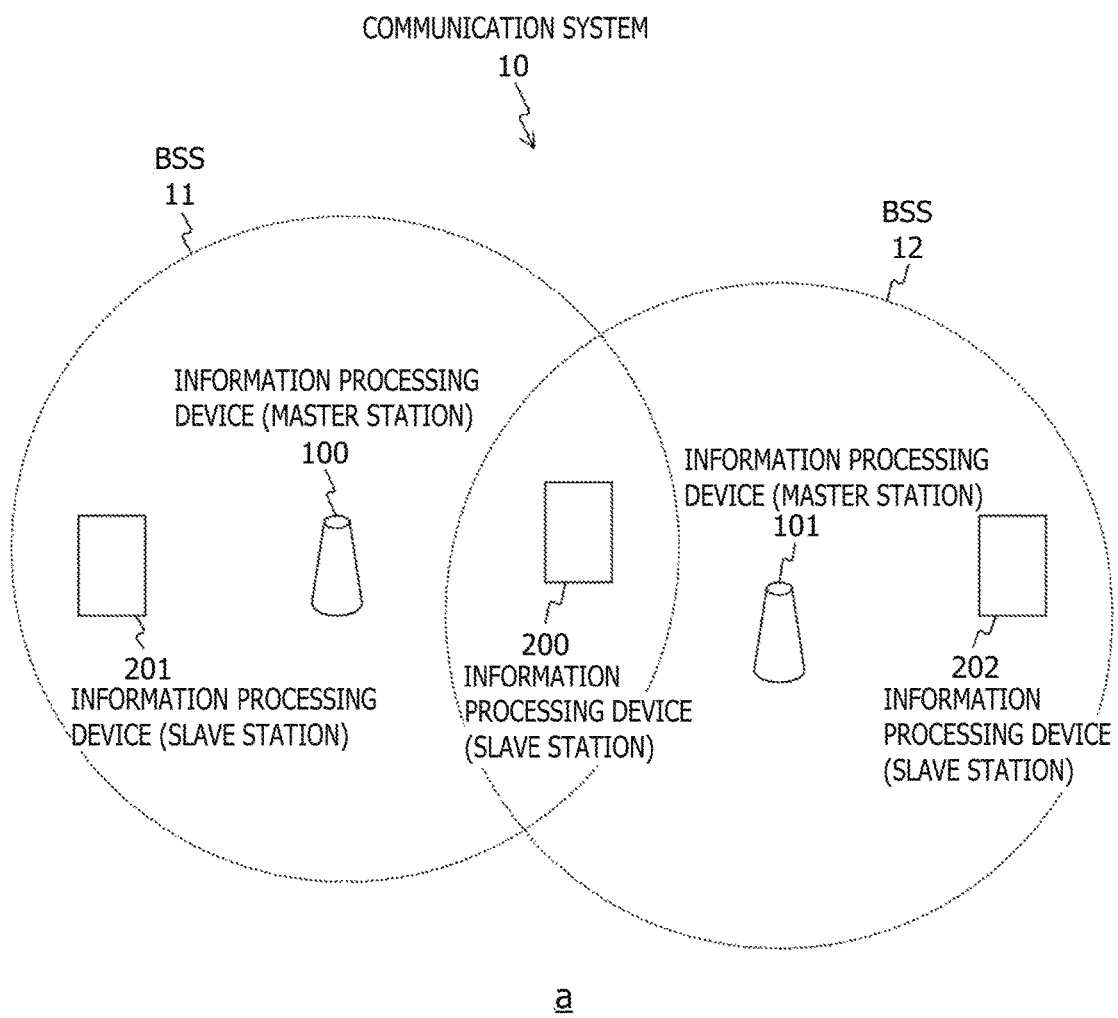
FIG. 1 is a schematic view depicting a typical overall configuration of a communication system 10 constituting a first embodiment of the present technology.

FIG. 1 is a schematic view depicting a typical overall configuration of a communication system 10 constituting the first embodiment of the present technology. Subfigure "a" in FIG. 1 schematically depicts a typical overall configuration of the communication system 10. Subfigure "b" in FIG. 1 depicts channels operated by master stations.

The communication system 10 includes information processing devices (master stations) 100 and 101 and information processing devices (slave stations) 200 to 202. In the ensuing description, the notations of the master and slave stations may be omitted or abbreviated where appropriate. Incidentally, the information processing device (master station) 100 is an example of the first information processing device stated in the appended claims. The information processing device (slave station) 200 is an example of the second information processing device stated in the appended claims.

A BBS 11 schematically represents a signal detection range of the information processing device (master station) 100. A BBS 12 schematically denotes a signal detection range of the information processing device (master station) 101.

The information processing devices 200 to 202 may each be a mobile information processing device (wireless communication device) having a wireless communication function. The information processing devices 100 and 101 may each be a stationary or mobile information processing device (wireless communication device) having the wireless communication function.

The mobile information processing device may be an information processing device such as smartphone, a mobile phone, or a tablet terminal. The stationary information processing device may be an information processing device such as an access point or a base station.

The information processing devices 100, 101, and 200 to 202 each include a communication function that complies with the wireless LAN standard under the IEEE 802.11, for example. The information processing devices 100, 101, and 200 to 202 further include functions including channel bonding according to the IEEE 802.11, for example. As the wireless LAN, Wireless Fidelity (Wi-Fi), Wi-Fi Direct, or Wi-Fi CERTIFIED Miracast specification (technical specification name: Wi-Fi Display) may be adopted, for example. Alternatively, some other suitable communication method may be used to implement wireless communication.

As depicted in Subfigure "b" of FIG. 1, the information processing device (master station) 100 operates on channels 36, 44, 52, and 64. The bandwidth of each of the channels is 20 MHz. The channels do not overlap with one another and are not contiguous with each other. The combined bandwidth of the channels is 80 MHz.

As depicted in Subfigure "b" of FIG. 1, the information processing device (master station) 101 operates on channel 52 that is 20 MHz wide. The information processing device (master station) 100 and the information processing device (master station) 101 are located close to each other and share the same channel 52. This environment is called an overlapping basic service set (OBSS) environment.

The information processing device (slave station) 200 and the information processing device (slave station) 201 are connected with the information processing device (master station) 100. The information processing device (slave station) 200 and the information processing device (slave station) 201 are located sufficiently apart from each other and do not receive signals from each other. The information processing device (slave station) 200 is located close to the information processing device (master station) 101 and receives signals therefrom.

The information processing devices 100 and 101 each function as a master station (base unit). The information processing devices 200 to 202 each function as a slave station (extension unit). The information processing devices 100 and 101 also function as an access point each. The information processing devices 200 to 202 each function as a subordinate device under the access point. It is to be noted that the system configuration addressed by the embodiment of the present technology is not limited to this configuration. Whereas FIG. 1 depicts a typical communication system made up of two wireless master stations and three wireless slave stations, the number of wireless master stations and that of wireless slave stations are not limited to those depicted in the drawing. For example, the embodiment of the present technology may be applied to a communication system including three or more wireless master stations (information processing devices). The embodiment of the present technology may also be applied to a communication system including two, four, or more wireless slave stations (information processing devices).

One of two information processing devices communicating with each other may function as a master station and the other as a slave station. Alternatively, two information processing devices may be set up as two slave stations communicating directly with each other.

(Typical Structure of Information Processing Device (Slave Station))

Figure 2:
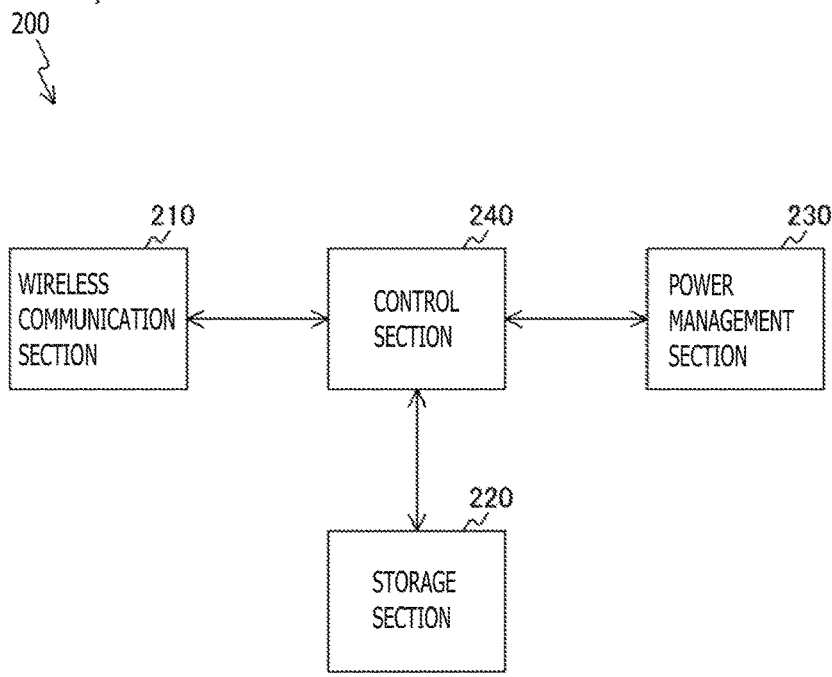
FIG. 2 is a block diagram depicting a typical functional (i.e., logical) structure of an information processing device (slave station) 200 as part of the first embodiment of the present technology.

FIG. 2 is a block diagram depicting a typical functional (i.e., logical) structure of the information processing device (slave station) 200 as part of the first embodiment of the present technology. The functional structure (regarding wireless communication) of the information processing devices (master stations) 100 and 101 and that of the information processing devices (slave stations) 201 and 202 are the same as the functional structure of the information processing device 200 and thus will not be discussed further.

The information processing device (slave station) 200 includes a wireless communication section 210, a storage section 220, a power management section 230, and a control section 240.

The wireless communication section 210 is a wireless communication interface that interfaces between the information processing device (slave station) 200 and another information processing device communicating wirelessly with each other. For example, under instructions from the control section 240, the wireless communication section 210 communicates wirelessly with another information processing device using one or multiple channels. For example, in accordance with the channel bonding under the IEEE 802.11, the wireless communication section 210 can communicate wirelessly with another information processing device. In the first embodiment of the present technology, the wireless communication section 210 communicates wirelessly with the information processing device (master station) 100. For example, the wireless communication section 210 receives a wireless signal sent from the information processing device (master station) 100. For the wireless communication section 210, the wireless signal transmitted from the information processing device (master station) 101 comes in as an interference wave.

The wireless communication section 210 also has the functions of an amplifier, a frequency converter, and a demodulator. For example, the wireless communication section 210 outputs the received data to the control section 240. The wireless communication section 210 also transmits wireless signals to the information processing device (master station) 100 via an antenna.

The wireless communication section 210 further includes the functions of a modulator, an amplifier, and the like. For example, the wireless communication section 210 modulates and amplifies the data output from the control section 240, before transmitting the data. Also, the wireless communication section 210 puts into the listening state only particular channels (monitor target channels) designated by the control section 240.

The listening state generally refers to an awake state (where the information processing device (slave station) 200 is active and ready to receive (i.e., to listen)). With the embodiment of the present technology, one or more channels selected from the available multiple channels are placed in the listening state and the other channels are left in the non-listening state. That is, when the information processing device (slave station) 200 is in the awake state, the selected one or more channels may be put into the listening state, with the other channels left in the non-listening state (i.e., non-receiving state). The non-listening (non-receiving) state is a state for reducing power consumption while signals from the master station are being awaited. In the ensuing description, the channels in the listening state will be referred to as the monitor target channels. That is, the monitor target channels are channels monitored while incoming signals are being awaited.

The storage section 220 stores diverse kinds of information. The storage section 220 supplies the stored information to the control section 240. For example, the storage section 220 stores and reproduces channel operation status with respect to various storage media. Also, the storage section 220 stores information about the channels operated by the information processing device (master station) 100, about the NAV (representing the packet transmission inhibition period) set for each channel by the control section 240, and about the presence or absence of interference waves on each of the channels involved.

Furthermore, the storage section 220 may store information about the channels operated within the own BSS. This information corresponds to what is exchanged using an HE Operation Information field 303 depicted in FIG. 3, for example.

The storage section 220 may further store the monitor target channels, received signal strengths (in power, per channel and for an average of all channels), interference signal strengths (in power, per channel), remaining battery level, and the presence or absence of data yet to be transmitted to the own device.

The power management section 230 manages the remaining battery level of the information processing device (slave station) 200. For example, the control section 240 receives remaining battery level information from the power management section 230 and references the remaining battery level managed by the power management section 230. If the remaining battery level is determined to be lower than a threshold level, the control section 240 may take action to save power.

The control section 240 controls the components of the information processing device (slave station) 200 on the basis of a control program stored in the storage section 220. For example, the control section 240 has the function of controlling the operation of the channels in the communication system 10. Specifically, the control section 240 keeps tabs on the status of the channels operated by the information processing device (master station) 100 with which the information processing device (slave station) 200 is connected as well as by the information processing device (master station) 101, selects the channels to be placed into the listening state (monitor target channels), and sets the selected channels to the wireless communication section 210.

As another example, given a notification from the information processing device (master station) 100, the control section 240 performs control accordingly to set the channel for use in wireless communication with the information processing device (master station) 100.

(Typical Format of Operating Channel Information)

Figure 3:
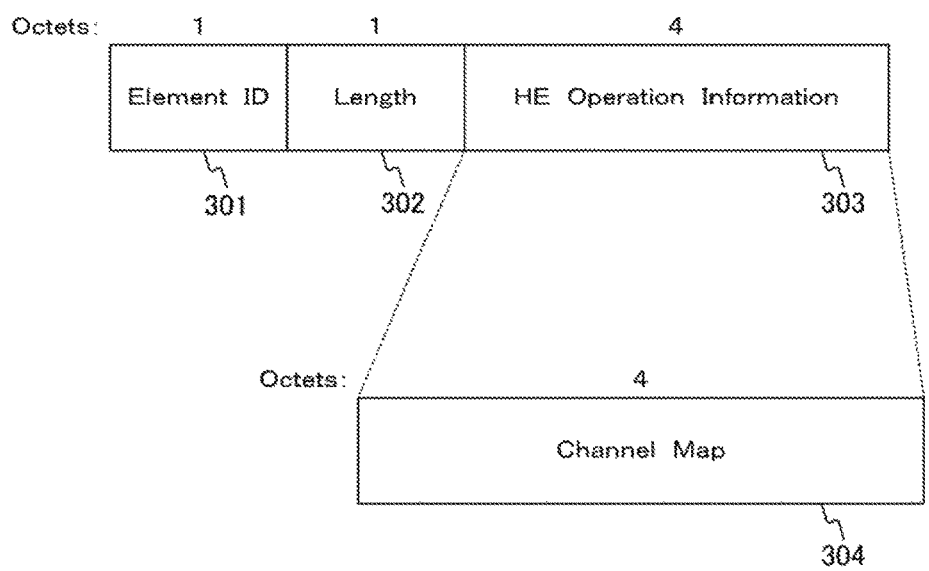
FIG. 3 is a schematic view depicting a typical format of elements including operating channel information transmitted and received between the devices making up the communication system 10 of the first embodiment of the present technology.

FIG. 3 is a schematic view depicting a typical format of elements including operating channel information transmitted and received between the devices making up the communication system 10 of the first embodiment of the present technology.

FIG. 4 is a schematic view depicting typical information (bit map information) about the channels operated by a master station as part of the communication system 10 of the first embodiment of the present technology. FIG. 4 indicates the bit map information about the information processing device (master station) 100 depicted in Subfigure "b" of FIG. 1.

An HE Operation element depicted in FIG. 3 is an element for giving the notification of information about the channels operated by the master station (operating channel information). Typically, the HE Operation element is included in a beacon when transmitted.

For example, the HE Operation element includes an Element Identification (ID) field 301, a Length field 302, and an HE Operation Information field 303. Incidentally, the element used for the notification of the operating channel information is called High Throughput (HT) under the IEEE 802.11n and Very High Throughput (VHT) under the IEEE 802.11ac.

The Element ID field 301 is a field that stores the element ID indicating that an element including the operating channel information is stored here.

The Length field 302 is a field that stores the length of this element.

The HE Operation Information field 303 stores information about the channels operated by the master station. FIG. 3 gives an example of using a Channel Map field 304 for describing a list of the channels operated by the master station as information about the channels operated by the master station.

The Channel Map field 304 stores bit map information for describing the list of the channels operated by the master station. An example of the bit map information is depicted in FIG. 4.

FIG. 4 depicts the bit map information that associates the numbers indicative of channels with the bit information (0, 1) corresponding to each channel operated by the master station. For example, "1" is set in the field of each bit corresponding to a channel operated by the master station, and "0" is set in the field of each bit corresponding to a channel not operated by the master station.

(Typical Format of RTS Frame)

Figure 5:
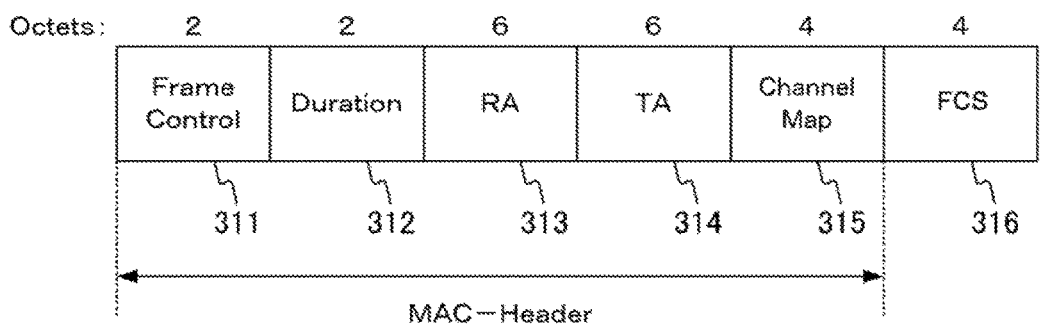
FIG. 5 is a schematic view depicting a typical format of a request-to-send (RTS) frame transmitted and received between the devices making up the communication system 10 of the first embodiment of the present technology.

FIG. 5 is a schematic view depicting a typical format of an RTS frame transmitted and received between the devices making up the communication system 10 of the first embodiment of the present technology.

The RTS frame is a typical frame in which information about the transmission-requested channels may be described.

The RTS frame includes a Frame Control field 311, a Duration field 312, a Receiver Address (RA) field 313, a Transmitter Address (TA) field 314, a Channel Map field 315, and a Frame Check Sequence (FCS) field 316.

The Frame Control field 311 is a field that stores information indicative of the type, purpose, and the like of the frame. The Duration field 312 is a field that stores information about the NAV. The RA field 313 is a field that stores information indicative of the destination of the frame. The TA field 314 is a field that stores information indicative of the transmission source of the frame. The FCS field 316 is a field that stores information for determining whether or not the frame contains any error.

The Channel Map field 315 stores the bit map information for describing a list of the channels requested for transmission by the master station. An example of the bit map information is depicted in FIG. 4.

In the bit map information depicted in FIG. 4, for example, "1" is set to the field of each bit corresponding to a channel requested for transmission by the master station, and "0" is set to the field of each bit corresponding to a channel not requested for transmission by the master station. In other words, "1" is set to the field of each bit corresponding to a channel that the master station wants to check to see if the slave station is free on that channel.

As described above, the bit map information (channel information) depicted in FIG. 4 indicates the relations of correspondence between multiple channels available for the wireless communication section of the master station on the one hand, and the channels used by the master station for wireless communication with the slave station on the other hand.

(Communication Example)

Figure 6:
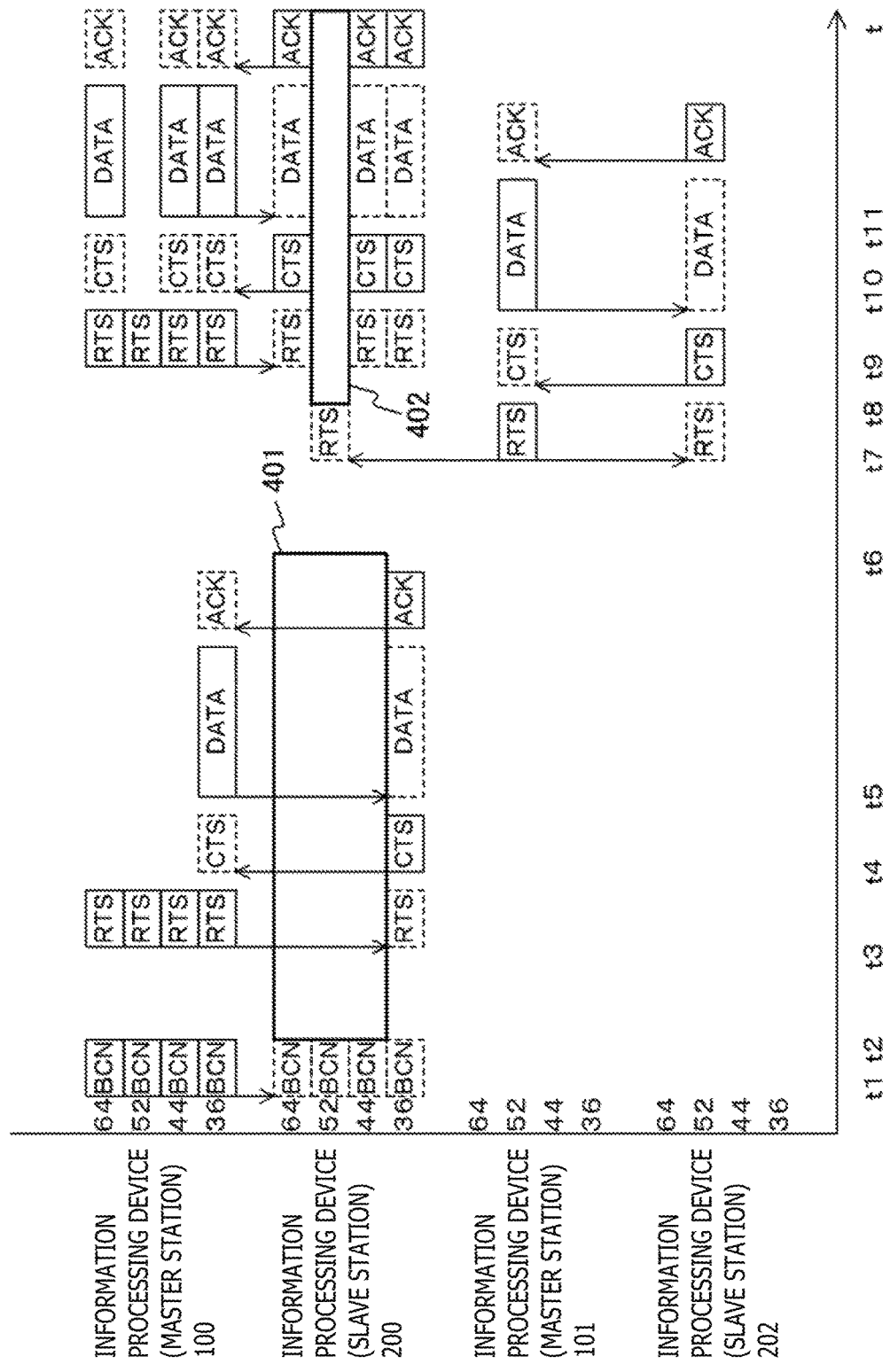
FIG. 6 is a schematic view depicting a communication example of information being transmitted and received between the devices making up the communication system 10 of the first embodiment of the present technology.

FIG. 6 is a schematic view depicting a communication example of information being transmitted and received between the devices making up the communication system 10 of the first embodiment of the present technology. Depicted in FIG. 6 is an example in which the information processing device (slave station) 200 in a waiting state selects the channels to be put into the listening state.

The horizontal axis of FIG. 6 denotes the time axis and the vertical axis of FIG. 6 schematically represents typical operation status of the channels of the devices making up the communication system 10. In FIG. 6, as in the example in Subfigure "b" of FIG. 1, the information processing devices (master stations) 100 and 101 are depicted operating the channels. That is, FIG. 6 depicts typical operation status in chronological order of four 20 MHz channels constituting an 80 MHz-wide channel.

At time t1, the wireless communication section (corresponding to the wireless communication section 210 in FIG. 2) of the information processing device (master station) 100 transmits a beacon using all channels (channels 36, 44, 52, and 64) operated by the information processing device (master station) 100. In FIG. 6, packets (frames) on the transmitting side are each indicated schematically by a solid-line rectangle with a name inside, and packets (frames) on the receiving side are each indicated schematically by a dotted-line rectangle with a name inside. Also in FIG. 6, the packets (frames) that are transmitted and received are categorized by channel. The packets (frames) are also depicted similarly in FIGS. 11, 12, and 17.

Also at time t1, the wireless communication section 210 of the information processing device (slave station) 200 receives the beacon transmitted from the information processing device (master station) 100. The control section 240 of the information processing device (slave station) 200 acquires the operating channel information stored in the HE Operation Information field 303 (depicted in FIG. 3) included in the received beacon. The control section 240 of the information processing device (slave station) 200 stores the acquired operating channel information (i.e., information about the channels operated by the information processing device (master station) 100) into the storage section 220 as the operating channel information of the information processing device (master station) 100. For example, the operating channel information may be stored into the storage section 220 using the format indicated in FIG. 4.

At time t2, the control section 240 of the information processing device (slave station) 200 performs control to let one or more channels transition to a non-listening state on the basis of whether a predetermined condition is met. For example, if the information processing device (slave station) 200 has no data to transmit to the information processing device (master station) 100, or if the remaining battery level of the information processing device (slave station) 200 is below a threshold value, the control section 240 determines that the predetermined condition is met. In that case, the control section 240 performs control to let one or more channels transition to the non-listening state. That is, one or more channels are excluded from the monitor target channels.

For example, the control section 240 of the information processing device (slave station) 200 may determine that channel 36 alone is to be placed in the listening state and that the remaining channels 44, 52 and 64 are to transition to the non-listening state. The control section 240 of the information processing device (slave station) 200 notifies the wireless communication section 210 of the content of the determination. Also, the control section 240 of the information processing device (slave station) 200 stores channel 36 into the storage section 220 as the monitor target channel (listening target channel).

The wireless communication section 210 of the information processing device (slave station) 200 then places channel 36 in the listening state. The wireless communication section 210 of the information processing device (slave station) 200 cancels the listening state of the remaining channels 44, 52 and 64 and lets them transition to the non-listening state. Furthermore, the wireless communication section 210 of the information processing device (slave station) 200 notifies the control section 240 that channel 36 is available. In turn, the control section 240 stores into the storage section 220 information indicating that channel 36 is available.

At time t3, the wireless communication section of the information processing device (master station) 100 transmits an RTS packet using all channels operated by the information processing device (master station) 100 (i.e., channels 36, 44, 52 and 64).

Also at time t3, the wireless communication section 210 of the information processing device (slave station) 200 receives on the monitor target channel (channel 36) the RTS packet transmitted from the information processing device (master station) 100. Based on the RTS packet, the control section 240 proceeds to acquire the channels (channels 36, 44, 52 and 64) that the information processing device (master station) 100 requests from the information processing device (slave station) 200 for transmission.

Specifically, the control section 240 of the information processing device (slave station) 200 acquires transmission-requested channel information stored in the Channel Map field 315 (depicted in FIG. 5) of the RTS packet. The control section 240 of the information processing device (slave station) 200 acquires the channels (channels 36, 44, 52 and 64) that the information processing device (master station) 100 requests from the information processing device (slave station) 200 for transmission.

At time t4, the control section 240 of the information processing device (slave station) 200 verifies the status of the monitor target channels stored in the storage section 220. The control section 240 of the information processing device (slave station) 200 then instructs the wireless communication section 210 to transmit a CTS packet (reception preparation complete packet) on all available channels. In the example of FIG. 6, the available channel is depicted to be solely channel 36.

The wireless communication section 210 of the information processing device (slave station) 200 receives the CTS packet generated by the control section 240. The wireless communication section 210 transmits the CTS packet to the information processing device (master station) 100 on the designated channel 36.

The wireless communication section of the information processing device (master station) 100 receives on channel 36 the CTS packet transmitted from the information processing device (slave station) 200. Based on the CTS packet, the control section of the information processing device (master station) 100 acquires the channel available (channel 36) for the information processing device (slave station) 200. For example, the control section of the information processing device (master station) 100 may determine that the channel on which the CTS packet has been received (i.e., channel 36) is available for the information processing device (slave station) 200.

At time t5, under instructions from the control section of the information processing device (master station) 100, the wireless communication section of the information processing device (master station) 100 transmits data to the information processing device (slave station) 200 on channel 36.

The wireless communication section 210 of the information processing device (slave station) 200 receives on channel 36 the data transmitted from the information processing device (master station) 100. Also, the wireless communication section 210 of the information processing device (slave station) 200 transmits on channel 36 an acknowledgement (ACK) of the data under instructions from the control section 240.

If there is a large quantity of data transmitted from the information processing device (master station) 100 (i.e., if data continues to be sent following the received data), the communication may be completed quickly by receiving data over a wider bandwidth. For this reason, the control section 240 of the information processing device (slave station) 200 may adjust the monitor target channels. An example of adjusting the monitor target channels will be discussed later in more detail with reference to FIGS. 9 and 10.

For example, at time t6, the control section 240 of the information processing device (slave station) 200 may instruct the wireless communication section 210 to change channels 44, 52 and 64 from the non-listening state to the listening state. In this case, the control section 240 of the information processing device (slave station) 200 adds channels 44, 52 and 64 to the list of monitor target channels stored in the storage section 220.

In that case, the wireless communication section 210 of the information processing device (slave station) 200 places all channels 36, 44, 52 and 64 in the listening state and notifies the control section 240 that these channels are available. The control section 240 of the information processing device (slave station) 200 stores into the storage section 220 information indicating that these channels are available.

At time t7, under instructions from the control section of the information processing device (master station) 101, the wireless communication section of the information processing device (master station) 101 transmits an RTS packet destined for the information processing device (slave station) 202 on channel 52 operated by the information processing device (master station) 101.

At this point, the wireless communication section 210 of the information processing device (slave station) 200 receives from the information processing device (master station) 101 the RTS packet destined for the information processing device (slave station) 202 on channel 52. In this case, the wireless communication section 210 of the information processing device (slave station) 200 notifies the control section 240 that channel 52 is not available. The control section 240 proceeds to calculate the packet transmission inhibition period (represented by a NAV) based on the RTS packet and stores the NAV into the storage section 220.

At time t8, the control section 240 of the information processing device (slave station) 200 may quit keeping the unavailable channel 52 in the listening state. In this case, the control section 240 of the information processing device (slave station) 200 instructs the wireless communication section 210 to let channel 52 transition to the non-listening state. At the same time, the control section 240 of the information processing device (slave station) 200 deletes channel 52 from the list of monitor target channels managed by the storage section 220.

At time t9, the wireless communication section of the information processing device (master station) 100 transmits an RTS packet using all channels (channels 36, 44, 52 and 64) operated by the information processing device (master station) 100.

Also at time t9, the wireless communication section 210 of the information processing device (slave station) 200 receives, on channels 36, 44 and 64 in the listening state, the RTS packet transmitted from the information processing device (master station) 100. Based on the RTS packet, the control section 240 proceeds to acquire the channels (channels 36, 44, 52 and 64) requested by the information processing device (master station) 100 from the information processing device (slave station) 200 for transmission.

At time t10, the control section 240 of the information processing device (slave station) 200 verifies the status of the monitor target channels stored in the storage section 220, and instructs the wireless communication section 210 to transmit a CTS packet on all available channels. In this case, the available channels are channels 36, 44 and 64.

The wireless communication section 210 of the information processing device (slave station) 200 receives the CTS packet generated by the control section 240, and transmits the CTS packet to the information processing device (master station) 100 on the designated channels 36, 44 and 64.

The wireless communication section of the information processing device (master station) 100 receives on channels 36, 44 and 64 the CTS packet transmitted from the information processing device (slave station) 200. Based on the CTS packet, the control section of the information processing device (master station) 100 proceeds to acquire the channels (channels 36, 44 and 64) available for the information processing device (slave station) 200.

At time t11, the wireless communication section of the information processing device (master station) 100 transmits data to the information processing device (slave station) 200 on channels 36, 44 and 64 under instructions from the control section of the information processing device (master station) 100.

The wireless communication section 210 of the information processing device (slave station) 200 receives the data transmitted from the information processing device (master station) 100 on channels 36, 44 and 64. The wireless communication section 210 of the information processing device (slave station) 200 transmits an ACK for the data on channels 36, 44 and 64 under instructions from the control section 240.

In the example of FIG. 6, as described above, the information processing device (slave station) 200 can save power for duration of the regions indicated by thick-line rectangles 401 and 402.

(Typical Operations of Information Processing Device (Master Station))

Figure 7:
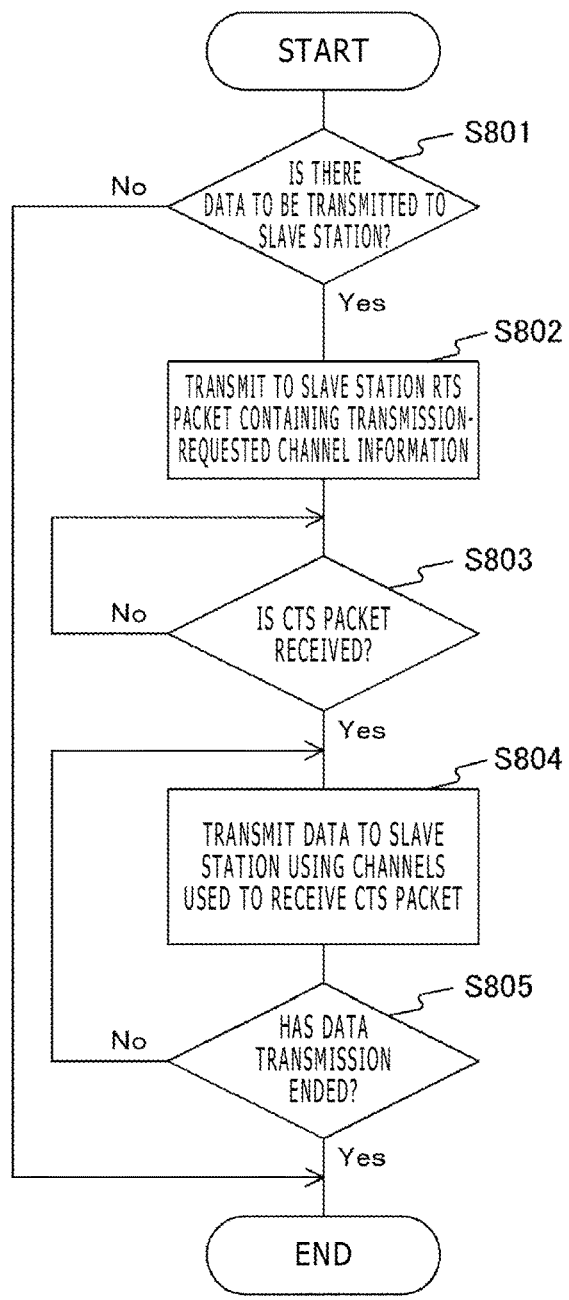
FIG. 7 is a flowchart depicting a typical procedure of a data transmission process performed by an information processing device (master station) 100 of the first embodiment of the present technology.

FIG. 7 is a flowchart depicting a typical procedure of a data transmission process performed by the information processing device (master station) 100 of the first embodiment of the present technology.

First, the control section of the information processing device (master station) 100 determines whether or not there is data to be transmitted to a slave station (step S801). If there is no data to be transmitted to a slave station (step S801), the control section terminates the operations of the data transmission process.

If there is data to be transmitted to a slave station (step S801), the control section of the information processing device (master station) 100 transmits an RTS packet containing transmission-requested channel information to the slave station (step S802). Incidentally, step S802 is an example of the second procedure stated in the appended claims.

The control section of the information processing device (master station) 100 proceeds to determine whether or not a CTS packet is received with regard to the transmitted RTS packet (step S803). If a CTS packet has yet to be received (step S803), the control section continues the monitoring.

If a CTS packet is received (step S803), the control section of the information processing device (master station) 100 transmits data to the slave station using the channels used to receive the CTS packet (step S804). Incidentally, step S804 is an example of the first procedure stated in the appended claims.

The control section of the information processing device (master station) 100 proceeds to determine whether or not data transmission has ended (step S805). If data transmission has yet to be terminated (step S805), the control section returns to step S804. If data transmission has ended (step S805), the control section terminates the operations of the data transmission process.

As described above, the control section of the information processing device (master station) 100 performs control to notify the slave station of the channel information (transmission-requested channel information) for identifying the channels for use in wireless communication with the slave station. Specifically, the control section of the information processing device (master station) 100 performs control to transmit a transmission request frame (RTS packet) containing the channel information (transmission-requested channel information). In this case, the control section of the information processing device (master station) 100 performs control to transmit the transmission request frame on the channels identified by the channel information (transmission-requested channel information).

Also, the control section of the information processing device (master station) 100 performs control to appropriate the channels used to receive a reception preparation complete frame (CTS packet) with regard to the transmission request frame as the channels for use in wireless communication with the slave station.

(Typical Operations of Information Processing Device (Slave Station))

Figure 8:
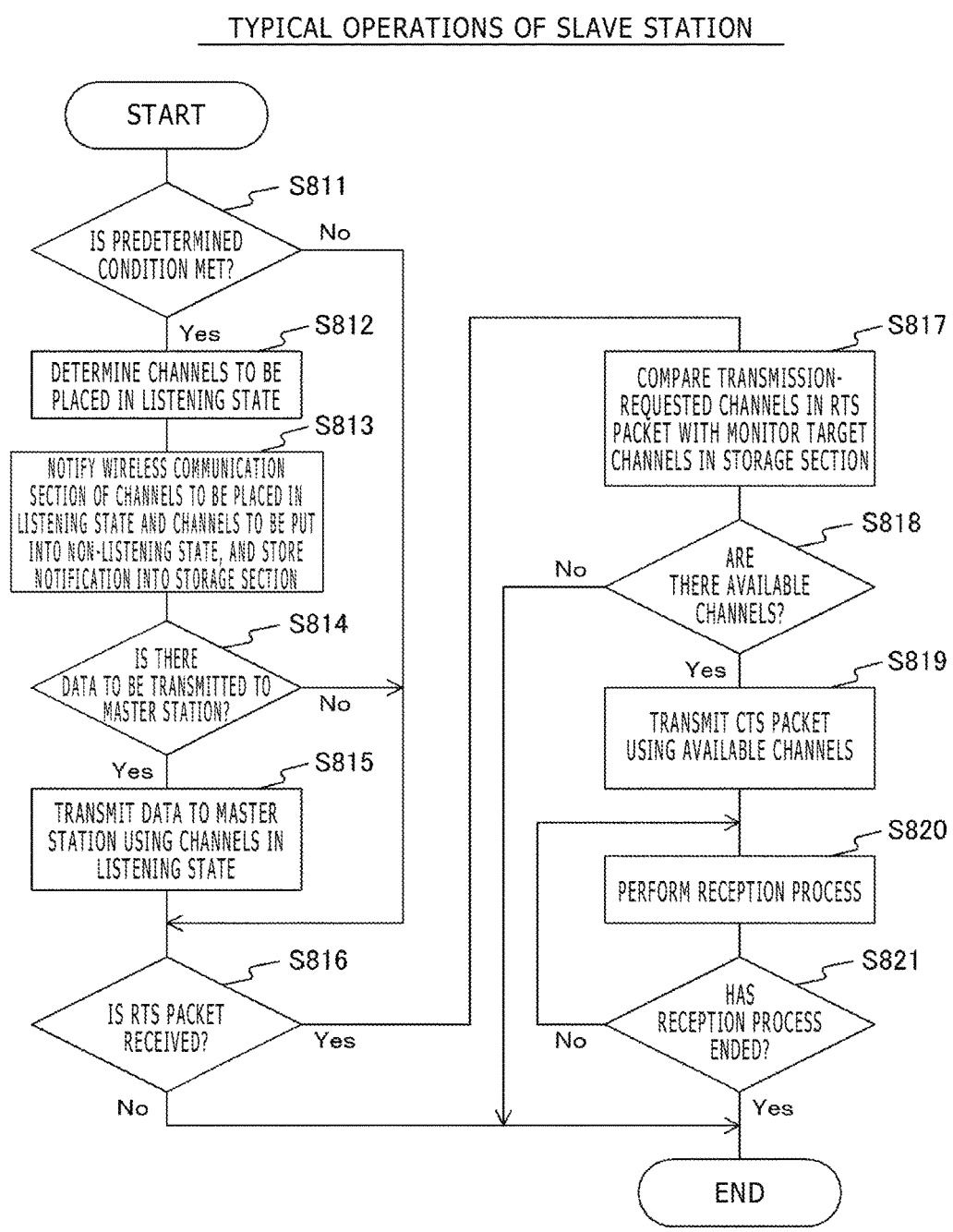
FIG. 8 is a flowchart depicting a typical procedure of a data communication process performed by the information processing device (slave station) 200 of the first embodiment of the present technology.

FIG. 8 is a flowchart depicting a typical procedure of a data communication process performed by the information processing device (slave station) 200 of the first embodiment of the present technology.

First, the control section 240 of the information processing device (slave station) 200 determines whether or not a predetermined condition for adjusting the monitor target channels is met (step S811). If the predetermined condition is not met (step S811), the control section 240 goes to step S816.

The predetermined condition may be the remaining battery level of the information processing device (slave station) 200, the presence or absence of the data to be transmitted or received, the received signal strength of the information processing device (slave station) 200, or interference from any other BSS, for example. If the remaining battery level of the information processing device (slave station) 200 is lower than a threshold value and if there exists data to be transmitted or received, the predetermined condition may be determined to be met. As another example, if the received signal strength of the information processing device (slave station) 200 is lower than a threshold value and if the interference from any other BSS is higher than a threshold value, the predetermined condition may also be determined to be met.

If the predetermined condition is met (step S811), the control section 240 of the information processing device (slave station) 200 determines the channels to be placed in the listening state (step S812). The control section 240 of the information processing device (slave station) 200 proceeds to notify the wireless communication section 210 of the channels to be placed in the listening state and of the channels to be put into the non-listening state, and causes the notification to be stored into the storage section 220 (step S813).

The control section 240 of the information processing device (slave station) 200 then determines whether or not there exists in the storage section 220 any data to be transmitted to the master station (step S814). If there is no data to be transmitted to the master station (step S814), the control section 240 goes to step S816.

If there exists data to be transmitted to the master station (step S814), the control section 240 of the information processing device (slave station) 200 transmits the data to the master station using the channels in the listening state (step S815).

The control section 240 of the information processing device (slave station) 200 further determines whether or not an RTS packet is received (step S816). If an RTS packet has yet to be received (step S816), the control section 240 terminates the operations of the data communication process.

If an RTS packet is received (step S816), the control section 240 of the information processing device (slave station) 200 compares the transmission-requested channels included in the received RTS packet with the monitor target channels stored in the storage section 220 (step S817). On the basis of the comparison, the control section 240 of the information processing device (slave station) 200 determines whether or not there are available channels (step S818). If there is no available channel (step S818), the control section 240 terminates the operations of the data communication process.

If there are available channels (step S818), the control section 240 of the information processing device (slave station) 200 transmits a CTS packet with regard to the received RTS packet to the master station using the available channels (step S819). Incidentally, steps S817 to S819 constitute an example of the second procedure stated in the appended claims.

Using the available channels, the control section 240 of the information processing device (slave station) 200 proceeds to perform a reception process in which the data transmitted from the master station is received (step S820). Step S820 is an example of the first procedure stated in the appended claims. The control section 240 of the information processing device (slave station) 200 then determines whether or not the reception process of receiving the data from the master station has ended (step S821). If the reception process has yet to be terminated (step S821), the control section 240 returns to step S820. If the reception process has ended (step S821), the control section 240 terminates the operations of the data communication process.

As described above, the control section 240 of the information processing device (slave station) 200 sets one or multiple channels to be the monitor target channels for use in monitoring signals. If the transmission request frame (RTS packet) is received, the control section 240 sets the channels to be used for wireless communication with the master station based on the result of the comparison between the transmission-requested channels and the monitor target channels.

(Typical Operations of Monitor Target Channel Adjustment Process (Slave Station))

FIG. 9 is a tabular view depicting typical information for use in a monitor target channel adjustment process performed by the information processing device (slave station) 200 of the first embodiment of the present technology.

FIG. 9 gives an example that depicts, in simplified terms, the relations of correspondence among remaining battery levels, received signal strengths, and monitor target channels. The example in FIG. 9 is one in which the own BSS is operated on a total bandwidth of 80 MHz.

Figure 10:
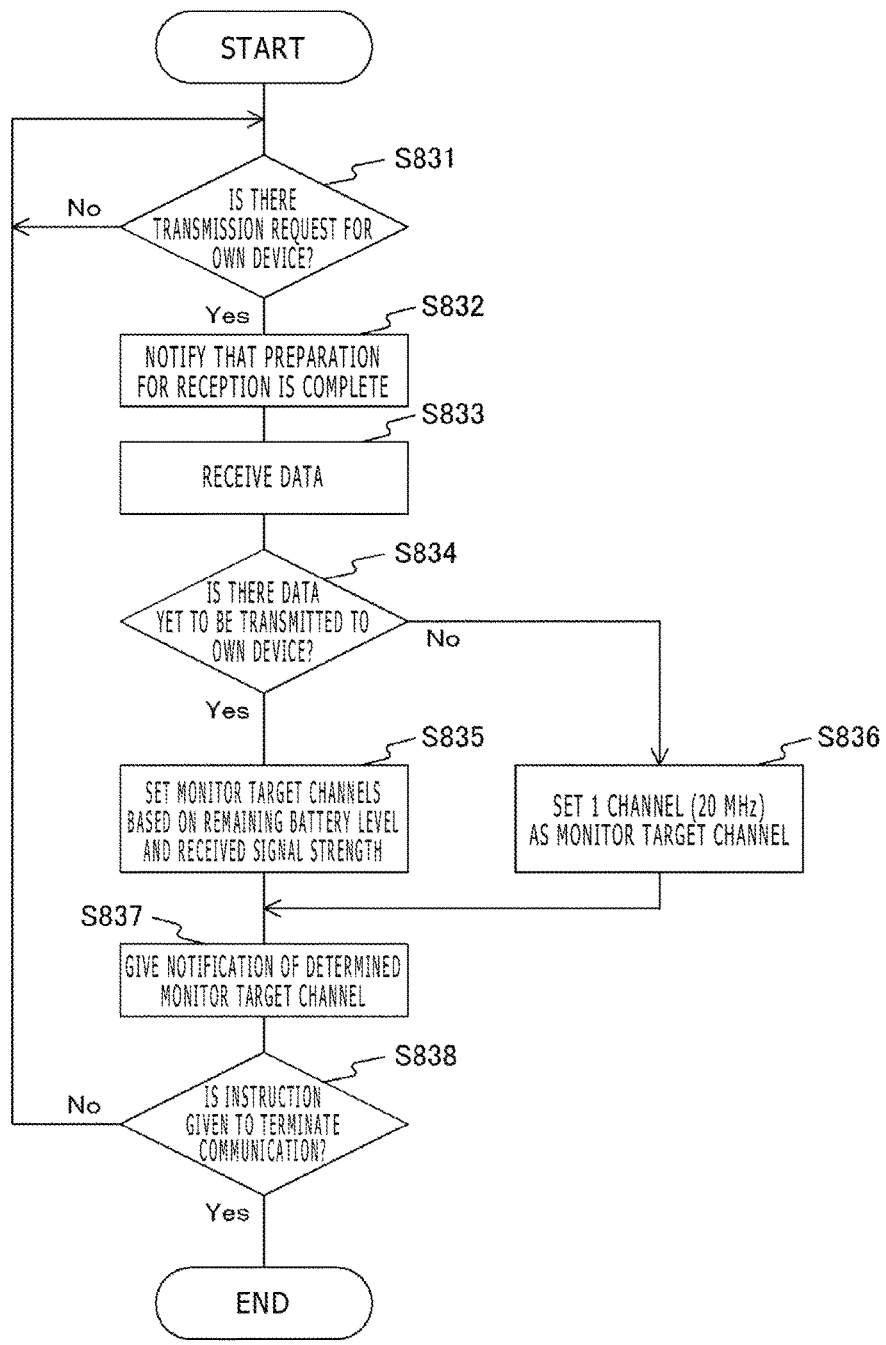
FIG. 10 is a flowchart depicting a typical procedure of the monitor target channel adjustment process performed by the information processing device (slave station) 200 of the first embodiment of the present technology.

FIG. 10 is a flowchart depicting a typical procedure of the monitor target channel adjustment process performed by the information processing device (slave station) 200 of the first embodiment of the present technology. That is, FIGS. 9 and 10 depict examples of adjusting the bandwidth of the channels to be placed in the listening state.

First, the control section 240 of the information processing device (slave station) 200 determines whether or not a transmission request (e.g., an RTS packet) is made by the master station to the own device (step S831). If there is no transmission request to the own device (step S831), the control section 240 continues the monitoring.

If there is a transmission request to the own device (step S831), the control section 240 of the information processing device (slave station) 200 notifies the master station that preparation for reception is complete (e.g., using a CTS packet) (step S832).

The control section 240 of the information processing device (slave station) 200 then performs a reception process of receiving data from the master station (step S833). The control section 240 of the information processing device (slave station) 200 proceeds to determine whether or not the master station has any data yet to be transmitted to the own device (step S834). In this case, the determination may be made based on whether or not the amount of data yet to be transmitted to the own device is more than a threshold value.

If the master station has data yet to be transmitted to the own device (step S834), the control section 240 of the information processing device (slave station) 200 sets monitor target channels (step S835). For example, the control section 240 of the information processing device (slave station) 200 acquires the remaining battery level and received signal strength of the own device. The control section 240 of the information processing device (slave station) 200 then sets the monitor target channels based on the remaining battery level and received signal strength of the own device and in accordance with the information depicted in FIG. 9 (step S835).

For example, if the received signal strength is high, data can be transmitted and received using a high-bit-rate (i.e., not robust) modulation method and a high coding rate. In this case, the reception is highly likely to end in a short time even with a narrow bandwidth. Thus a narrow bandwidth is used.

On the other hand, if the received signal strength is low, data needs to be transmitted and received using a low-bit-rate (i.e., robust) modulation method and a low coding rate. In this case, the bandwidth is widened to reduce the time in which the data is received.

If the master station has no more data to be transmitted to the own device (step S834), the control section 240 of the information processing device (slave station) 200 sets one channel as the monitor target channel (step S836).

Also, the control section 240 of the information processing device (slave station) 200 notifies the master station of the monitor target channel thus determined (step S837). For example, the control section 240 may give the notification using a monitor target channel notification frame depicted in FIG. 14.

The control section 240 of the information processing device (slave station) 200 proceeds to determine whether or not an instruction is given to terminate data communication (step S838). If the instruction is given to terminate data communication (step S838), the control section 240 terminates the monitor target channel adjustment process. If no instruction is given to terminate data communication (step S838), the control section 240 returns to step S831.

As described above, the control section 240 of the information processing device (slave station) 200 may set the channels for use in wireless communication with the master station on the basis of the remaining battery level and received signal strength of the information processing device (slave station) 200.

The examples depicted in FIGS. 9 and 10 are based on the assumption that data transmission time and data reception time most affect power consumption. However, these examples are not limitative of the present technology. Alternatively, in reference to the actual operation and power consumption, the content of the information depicted in FIG. 9 (i.e., content of the matrix) may be dynamically varied while the configured devices are being used.

(Other Communication Examples)

Figure 11:
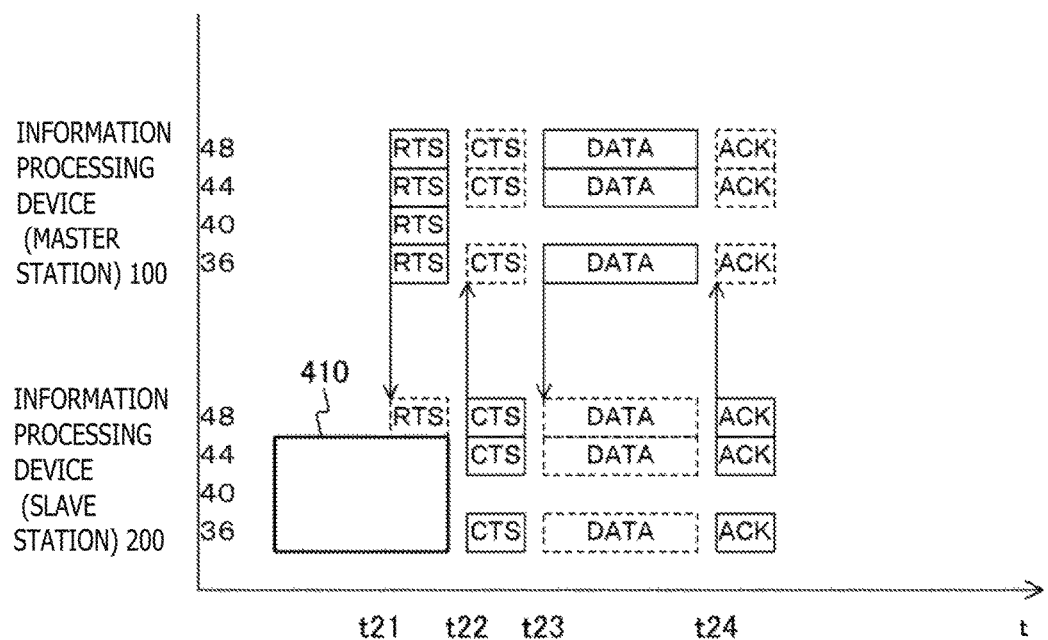
FIG. 11 is a schematic view depicting another communication example of information being transmitted and received between the devices making up the communication system 10 of the first embodiment of the present technology.
Figure 12:
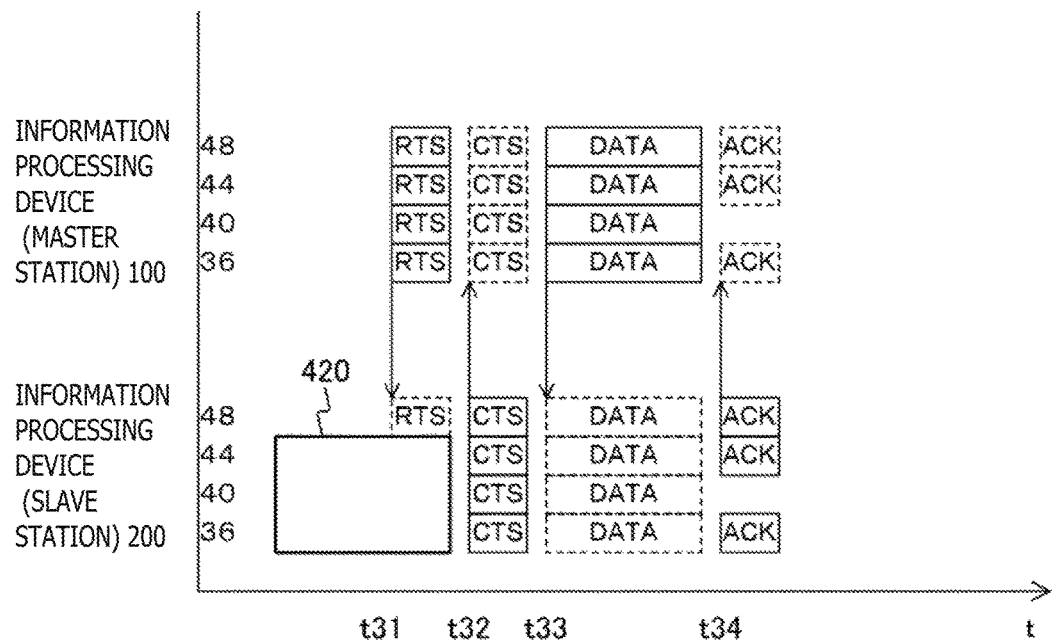
FIG. 12 is a schematic view depicting another communication example of information being transmitted and received between the devices making up the communication system 10 of the first embodiment of the present technology.

FIGS. 11 and 12 are schematic views depicting other communication examples of information being transmitted and received between the devices making up the communication system 10 of the first embodiment of the present technology.

The horizontal axis in FIGS. 11 and 12 denotes the time axis. The vertical axis in FIGS. 11 and 12 schematically represents typical channel operation status of the devices making up the communication system 10. FIG. 11 depicts an example where channels 36, 40, 44 and 48 are available for the information processing device (master station) 100 and where channels 36, 44 and 48 are available for the information processing device (slave station) 200. FIG. 12 depicts an example where channels 36, 40, 44 and 48 are available for both the information processing device (master station) 100 and the information processing device (slave station) 200.

In FIGS. 11 and 12, it is assumed that only channel 48 is placed in the listening state for the information processing device (slave station) 200, with the remaining channels set for transition to the non-listening state.

At time t21 in FIG. 11, the wireless communication section of the information processing device (master station) 100 transmits an RTS packet using all channels (channels 36, 40, 44 and 48) operated by the information processing device (master station) 100.

At time t21, the wireless communication section 210 of the information processing device (slave station) 200 receives on channel 48 the RTS packet transmitted from the information processing device (master station) 100. Based on the RTS packet, the control section 240 then acquires the channels (channels 36, 44, 52 and 64) requested by the information processing device (master station) 100 from the information processing device (slave station) 200 for transmission.

At time t22, the control section 240 of the information processing device (slave station) 200 verifies the status of the monitor target channels stored in the storage section 220, and instructs the wireless communication section 210 to transmit a CTS packet on all available channels. The channels available for the information processing device (slave station) 200 are channels 36, 44 and 48. Thus the wireless communication section 210 transmits the CTS packet on channels 36, 44 and 48.

The wireless communication section of the information processing device (master station) 100 receives on channels 36, 44 and 48 the CTS packet transmitted from the information processing device (slave station) 200. Then at time t23 and time t24, the information processing device (master station) 100 and the information processing device (slave station) 200 exchange data and ACKs with each other using channels 36, 44 and 48.

FIG. 12 gives an example where the CTS packet and data are transmitted using channels 36, 40, 44 and 48 and where ACKs are transmitted using channels 36, 44 and 48.

In the examples depicted in FIGS. 11 and 12, as described above, the information processing device (slave station) 200 can reduce power consumption while waiting for an RTS packet to arrive and when performing the process of receiving the RTS packet. Typically, the information processing device (slave station) 200 can save power for duration of the regions indicated by thick-line rectangles 410 and 420 in the drawings.

2. Second Embodiment

The second embodiment of the present technology involves allowing the slave station to notify the master station of monitor target channels.

The configuration of the information processing devices making up the second embodiment of the present technology is approximately the same as that of the information processing devices 100, 101, and 200 to 202 depicted in FIG. 1 and elsewhere. The elements that are the same as those in the first embodiment of the present technology are given the same reference signs and their explanations are partially omitted hereunder.

(Typical Format of Monitor Target Channel Notification Frame)

FIG. 13 is a schematic view depicting typical information about the monitor target channels of a slave station as part of the communication system 10 constituting the second embodiment of the present technology.

FIG. 13 depicts bit map information in which the numbers indicative of channels are associated with bit information (0, 1) corresponding to the monitor target channels of the slave station. For example, "1" is set to the field of each bit corresponding to a monitor target channel, and "0" is set to the field of each bit not corresponding to any monitor target channel.

Figures 14, 15:
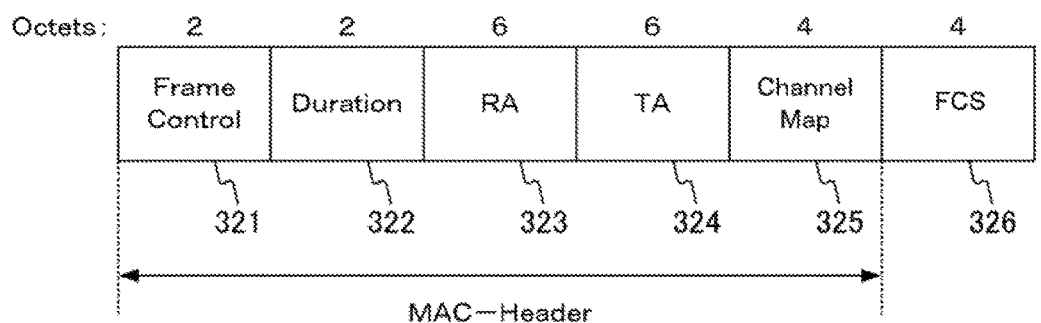
FIG. 14 is a schematic view depicting a typical format of a monitor target channel notification frame transmitted and received between the devices making up the communication system 10 of the second embodiment of the present technology.
FIG. 15 is a schematic view depicting typical information about the monitor target channels of a slave station as part of the communication system 10 of the second embodiment of the present technology.

FIG. 14 is a schematic view depicting a typical format of a monitor target channel notification frame transmitted and received between the devices making up the communication system 10 of the second embodiment of the present technology.

The monitor target channel notification frame is a typical frame that allows the slave station to notify the master station of the monitor target channels.

The monitor target channel notification frame includes a Frame Control field 321, a Duration field 322, an RA field 323, a TA field 324, a Channel Map field 325, and an FCS field 326. The Frame Control field 321, Duration field 322, RA field 323, TA field 324, Channel Map field 325, and FCS field 326 correspond to the elements of the same names depicted in FIG. 5.

The Channel Map field 325 stores the bit map information for describing a list of monitor target channels for the slave station. An example of the bit map information is depicted in FIG. 13.

The example in FIG. 13 is one in which, with the own BSS operated using a total bandwidth of 80 MHz made up of channels 36, 44, 52 and 64, the information processing device (slave station) 200 sets only channel 36 as the monitor target channel.

Conceivably, notified by a beacon from the master station, the slave station may be cognizant beforehand of the channels currently operated by the master station. For example, the information processing device (slave station) 200 may be informed beforehand of the channels (e.g., four 20 MHz channels making up a total of 80 MHz bandwidth) being operated by the information processing device (master station) 100. In such a case, information other than the bit map information depicted in FIG. 13 may be used instead. An example of such alternative information is depicted in FIG. 15.

(Example of Channel Map Field)

FIG. 15 is a schematic view depicting typical information about the monitor target channels of a slave station as part of the communication system 10 of the second embodiment of the present technology.

For example, four channels currently operated by the information processing device (master station) 100 may be represented by four bits, with "1" set to the field of each bit corresponding to a monitor target channel and "0" set to the field of each bit not corresponding to any monitor target channel.

Depicted in FIG. 15 is an example in which, with the own BSS operated using channels 36, 44, 52 and 64 constituting a total bandwidth of 80 MHz, the information processing device (slave station) 200 sets only channel 36 as the monitor target channel.

For example, the control section 240 of the information processing device (slave station) 200 may freely select one or multiple monitor target channels on the basis of a predetermined condition. The predetermined condition may be the remaining battery level of the information processing device (slave station) 200, the presence or absence of data to be transmitted or received from then on, the received signal strength of the information processing device (master station) 100, or interference from another BSS, for example.

If the monitor target channels are changed due to some event, the control section 240 of the information processing device (slave station) 200 updates the monitor target channel information stored in the storage section 220. Also, the control section 240 of the information processing device (slave station) 200 instructs the wireless communication section 210 to transmit a monitor target channel notification (e.g., using the monitor target channel notification frame depicted in FIG. 14) to the information processing device (master station) 100.

The information processing device (master station) 100 stores the information about the monitor target channels of the slave stations connected with the own device. Upon receiving the monitor target channel notification from the information processing device (slave station) 200, the information processing device (master station) 100 updates the previously stored information about the monitor target channels of the information processing device (slave station) 200.

If there is data to be transmitted to the information processing device (slave station) 200, the information processing device (master station) 100 verifies the monitor target channels of the information processing device (slave station) 200, and transmits an RTS packet on all channels desired for data transmission. In this case, at least one of the channels desired for data transmission is selected from the monitor target channels of the information processing device (slave station) 200 to ensure unfailing transmission and reception of the data. As with the first embodiment of the present technology, the RTS packet describes the information about the channel (or channels) desired to be used for data transmission.

The wireless communication section 210 of the information processing device (slave station) 200 receives the RTS packet on one or multiple monitor target channels.

The control section 240 of the information processing device (slave station) 200 further selects available channels from the channels (one or more) described in the RTS packet and desired to be used for data transmission. The control section 240 of the information processing device (slave station) 200 instructs the wireless communication section 210 to transmit a CTS packet on all available channels. The CTS packet describes the channels (one or more) available for data reception. A typical format of the CTS frame is depicted in FIG. 16.

(Typical Format of CTS Frame)

Figure 16:
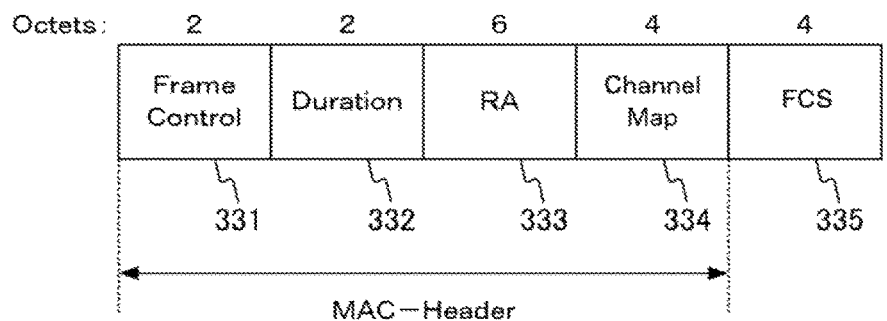
FIG. 16 is a schematic view depicting a typical format of a clear-to-send (CTS) frame transmitted and received between the devices making up the communication system 10 of the second embodiment of the present technology.

FIG. 16 is a schematic view depicting a typical format of a CTS frame transmitted and received between the devices making up the communication system 10 of the second embodiment of the present technology.

The CTS frame is a typical reception preparation complete frame in which information about the monitor target channels of the slave station may be described.

The CTS frame includes a Frame Control field 331, a Duration field 332, an RA field 333, a Channel Map field 334, and an FCS field 335. These fields correspond to the fields of the same names depicted in FIG. 5.

(Communication Examples)

Figure 17:
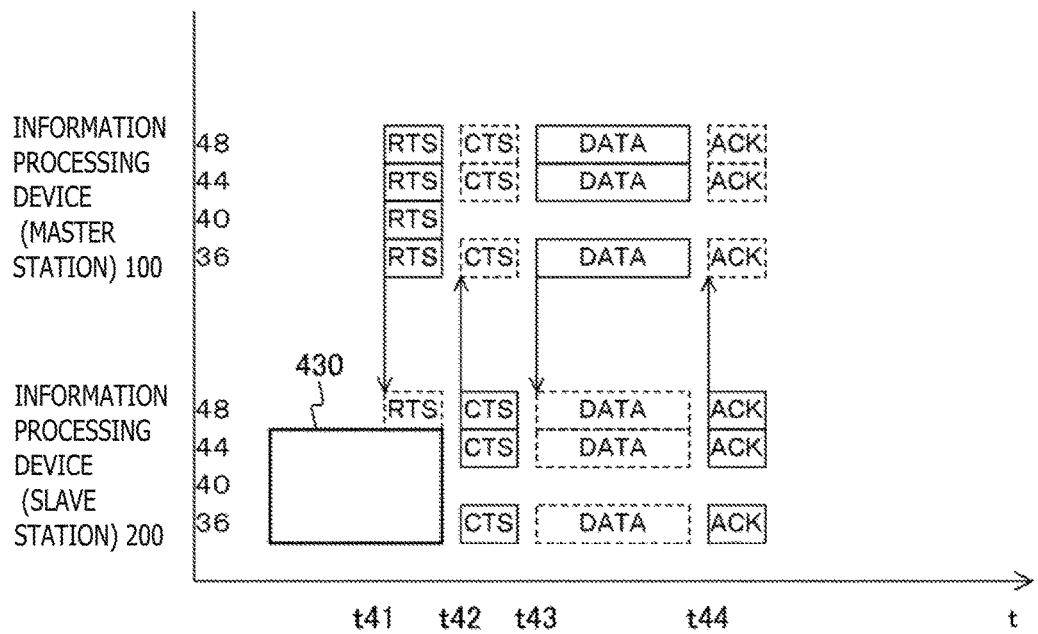
FIG. 17 is a schematic view depicting a communication example of information being transmitted and received between the devices making up the communication system 10 of the second embodiment of the present technology.

FIG. 17 is a schematic view depicting a communication example of information being transmitted and received between the devices making up the communication system 10 of the second embodiment of the present technology.

The horizontal axis in FIG. 17 denotes the time axis. The vertical axis in FIG. 17 schematically represents typical channel operation status of the devices making up the communication system 10. FIG. 17 depicts an example where channels 36, 40, 44 and 48 are available for the information processing device (master station) 100 and where channels 36, 44 and 48 are available for the information processing device (slave station) 200.

In FIG. 17, it is assumed that only channel 48 is placed in the listening state for the information processing device (slave station) 200, with the remaining channels set for transition to the non-listening state.

At time t41, the wireless communication section of the information processing device (master station) 100 transmits an RTS packet using all channels (channels 36, 40, 44 and 48) operated by the information processing device (master station) 100.

At time t41, the wireless communication section 210 of the information processing device (slave station) 200 receives on channel 48 the RTS packet transmitted from the information processing device (master station) 100. Based on the RTS packet, the control section 240 then acquires the channels (channels 36, 44, 52 and 64) requested by the information processing device (master station) 100 from the information processing device (slave station) 200 for transmission.

At time t42, the control section 240 of the information processing device (slave station) 200 verifies the status of the monitor target channels stored in the storage section 220, and instructs the wireless communication section 210 to transmit a CTS packet on all available channels. The channels available for the information processing device (slave station) 200 are channels 36, 44 and 48. Thus the wireless communication section 210 transmits the CTS packet on channels 36, 44 and 48. The CTS packet also stores information about the available channels (monitor target channels of the slave station) as depicted in FIG. 16.

The wireless communication section of the information processing device (master station) 100 receives the CTS packet transmitted from the information processing device (slave station) 200 on channels 36, 44 and 48. The control section of the information processing device (master station) 100 can identify the channels available for the information processing device (slave station) 200 based on the information (in the Channel Map field 334 depicted in FIG. 16) included in the CTS packet.

At time t43 and time t44, the information processing device (master station) 100 and the information processing device (slave station) 200 exchange data and ACKs with each other using channels 36, 44 and 48.

In the example of FIG. 17, as described above, the information processing device (slave station) 200 can reduce power consumption while waiting for an RTS packet to arrive and when performing the process of receiving the RTS packet. Typically, the information processing device (slave station) 200 can save power for duration of the region indicated by a thick-line rectangle 430 in the drawing.

As described above, the control section 240 of the information processing device (slave station) 200 performs control to transmit a reception preparation complete frame (CTS packet) including the channel information (monitor target channels of the slave station). In this case, the control section 240 of the information processing device (slave station) 200 performs control to transmit the reception preparation complete frame (CTS packet) on the monitor target channels.

According to the above-described embodiment of the present technology, channel bonding is implemented in a wireless LAN system with space effectively utilized regardless of the primary channel and with power consumption reduced in the waiting state. In other words, where channel bonding is implemented in a wireless LAN system, signals are awaited only on limited channels while the remaining channels are placed in the non-listening state. This reduces the power consumption in the waiting state. That is, channel bonding technology may be used to lower the power consumption in the waiting state. It is also possible appropriately to set the channels for use in wireless communication.

3. Applications

The technology of the present disclosure may be applied to diverse products. For example, the information processing devices 100, 101, and 200 to 202 may each be implemented as a mobile terminal such as a smartphone, a tablet personal computer (PC), a laptop PC, a portable game terminal, or a digital camera; as a fixed terminal such as a television set, a printer, a digital scanner, or network storage; or as a vehicle-mounted terminal such as a car navigation device. The information processing devices 100, 101, and 200 to 200 may also be implemented each as a terminal (also called a machine type communication (MTC) terminal) that performs machine-to-machine (M2M) communication such as a smart meter, an automatic vending machine, remote-monitoring equipment, or a point-of-sale (POS) terminal. Furthermore, the information processing devices 100, 101, and 200 to 202 may each be implemented as a wireless communication module (e.g., an integrated circuit module made of one die) that is mounted on these terminals.

Meanwhile, the information processing devices 100 and 101 may each be implemented as a wireless LAN access point (also called a wireless base station) that has or is devoid of a router capability. The information processing devices 100 and 101 may also be implemented each as a mobile wireless LAN router. Moreover, the information processing devices 100 and 101 may each be a wireless communication module (e.g., an integrated circuit module made of one die) that is mounted on these devices.

3-1. First Application

Figure 18:
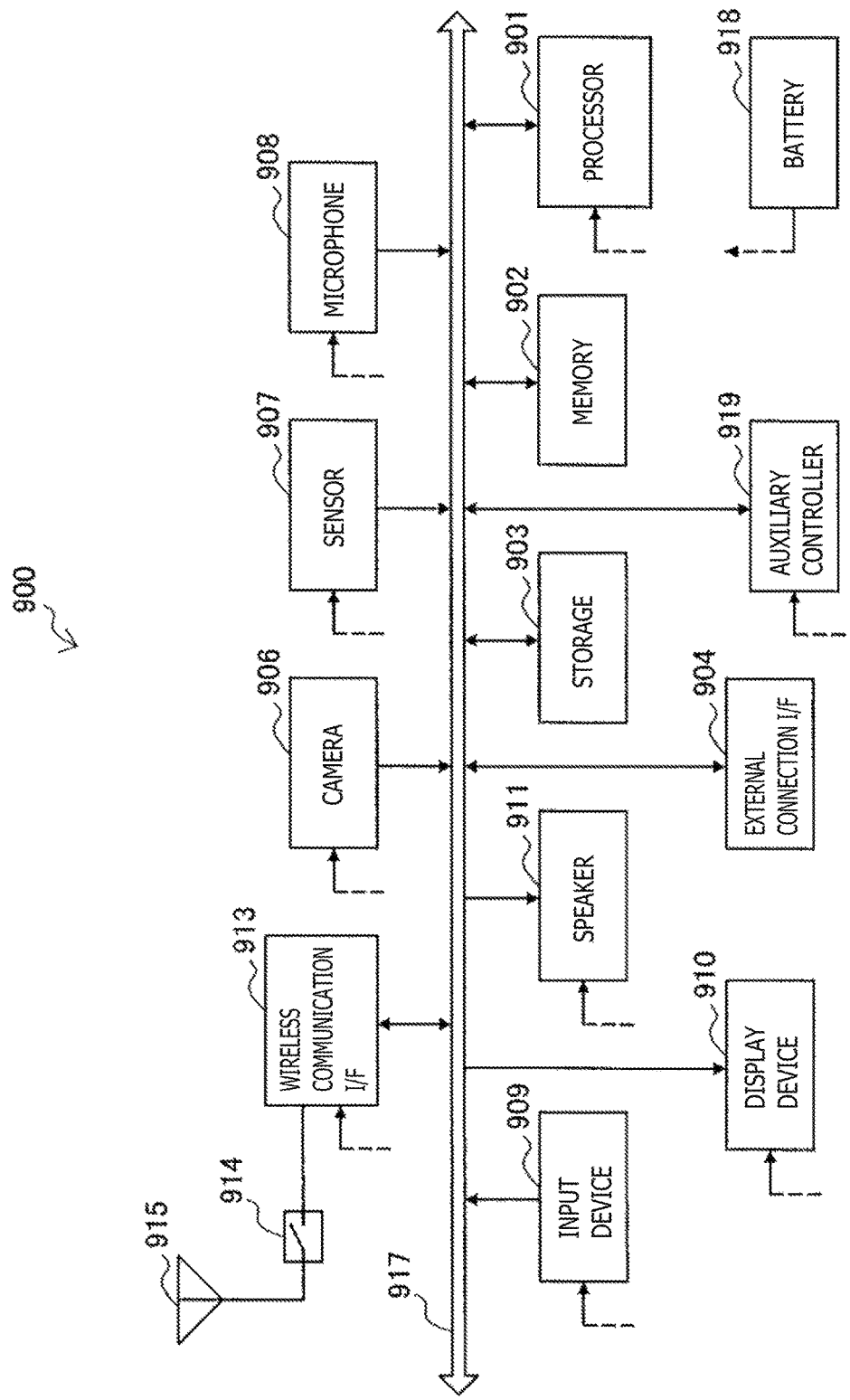
FIG. 18 is a block diagram depicting a typical schematic configuration of a smartphone.

FIG. 18 is a block diagram depicting a typical schematic configuration of a smartphone 900 to which the technology of the present disclosure may be applied. The smartphone 900 includes a processor 901, a memory 902, storage 903, an external connection interface 904, a camera 906, sensors 907, a microphone 908, an input device 909, a display device 910, speakers 911, a wireless communication interface 913, an antenna switch 914, an antenna 915, a bus 917, a battery 918, and an auxiliary controller 919.

The processor 901 may be a central processing unit (CPU) or a system-on-chip (SoC), for example, which controls the functions of the application layer and other layers of the smartphone 900. The memory 902 includes a random access memory (RAM) and a read-only memory (ROM), and stores the programs and data to be run and operated on by the processor 901. The storage 903 may include a storage medium such as a semiconductor memory and a hard disk. The external connection interface 904 is an interface that connects an external device such as a memory card or a universal serial bus (USB) device with the smartphone 900.

The camera 906 includes an imaging element such as a charge coupled device (CCD) or a complementary metal oxide semiconductor (CMOS) that generates captured images.

The sensors 907 may be a group of sensors including a positioning sensor, a gyro sensor, a geomagnetic sensor, and an acceleration sensor. The microphone 908 converts the sounds input to the smartphone 900 into audio signals. The input device 909 may include a touch sensor for detecting touches on a screen of the display device 910, a keypad, a keyboard, buttons, or switches that receive the operations or information input by a user. The display device 910 has a screen such as a liquid crystal display (LCD) or an organic light-emitting diode (OLED) display that displays images output from the smartphone 900. The speakers 911 convert the audio signals output from the smartphone 900 into sounds.

The wireless communication interface 913 performs wireless communication by supporting at least one of wireless LAN standards such as the IEEE 802.11a, 802.11, 802.11g, 802.11n, 802.11ac, and 802.11ad. In infrastructure mode, the wireless communication interface 913 may communicate with another device via a wireless LAN access point. In direct communication mode such as ad-hoc mode or Wi-Fi Direct mode, the wireless communication interface 913 may communicate directly with another device. In Wi-Fi Direct mode, unlike in ad-hoc mode, one of two communicating terminals functions as an access point. In this mode, the two terminals communicate directly with each other. Typically, the wireless communication interface 913 may include a baseband processor, a radio frequency (RF) circuit, and a power amplifier. The wireless communication interface 913 may be a one-chip module that integrates a memory for storing a communication control program, a processor for executing that program, and related circuits. In addition to the wireless LAN method, the wireless communication interface 913 may support other types of wireless communication methods such as near-field communication method, close proximity communication method, or cellular communication method. The antenna switch 914 switches multiple circuits which are included in the wireless communication interface 913 (e.g., circuits for different wireless communication methods) and to which the antenna 915 is connected. The antenna 915 has one or multiple antenna elements (e.g., antenna elements constituting a multi-input multi-output (MIMO) antenna) and is used to transmit and receive wireless signals via the wireless communication interface 913.

The example in FIG. 18 is not limitative of how the smartphone 900 is configured. Alternatively, the smartphone 900 may include multiple antennas (e.g., an antenna for a wireless LAN, an antenna for close proximity communication, etc.). In such a case, the antenna switch 914 may be omitted from the configuration of the smartphone 900.

The bus 917 interconnects the processor 901, memory 902, storage 903, external connection interface 904, camera 906, sensors 907, microphone 908, input device 909, display device 910, speakers 911, wireless communication interface 913, and auxiliary controller 919. The battery 918 supplies power to each of the blocks of the smartphone 900 depicted in FIG. 18 via feeder lines partially indicated by broken lines in the drawing. The auxiliary controller 919 allows minimal functions of the smartphone 900 to remain active in sleep mode, for example.

In the smartphone 900 depicted in FIG. 18, the control section 240 explained above with reference to FIG. 2 may be implemented using the wireless communication interface 913. At least some of the functions may be implemented using the processor 901 or the auxiliary controller 919.

The smartphone 900 may be allowed to operate as a wireless access point (software AP) with the processor 901 executing an access point function on the application level. The wireless communication interface 913 may include a wireless access point function.

3-2. Second Application

Figure 19:
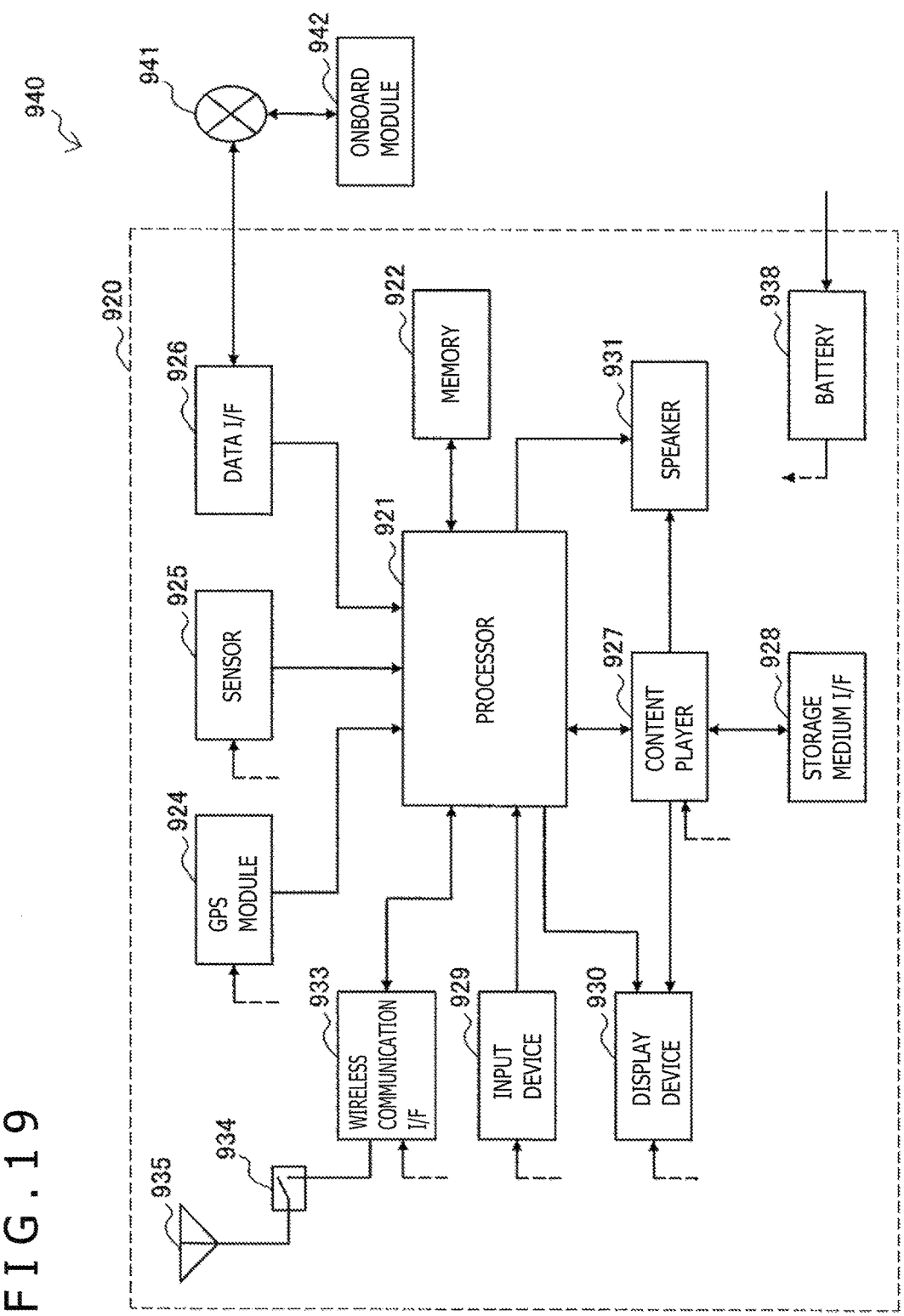
FIG. 19 is a block diagram depicting a typical schematic configuration of a car navigation device.

FIG. 19 is a block diagram depicting a typical schematic configuration of a car navigation device 920 to which the technology of the present disclosure may be applied. The car navigation device 920 includes a processor 921, a memory 922, a global positioning system (GPS) module 924, sensors 925, a data interface 926, a content player 927, a storage medium interface 928, an input device 929, a display device 930, speakers 931, a wireless communication interface 933, an antenna switch 934, an antenna 935, and a battery 938.

The processor 921 may be a CPU or an SoC, for example, which controls the navigation function and other functions of the car navigation device 920. The memory 922 includes a RAM and a ROM, and stores the programs and data to be run and operated on by the processor 921.

The GPS module 924 measures the position of the car navigation device 920 (e.g., in latitude, longitude and altitude) using GPS signals received from GPS satellites.

The sensors 925 may be a group of sensors including a gyro sensor, a geomagnetic sensor, and an atmospheric pressure sensor. The data interface 926 may be connected with an onboard network 941 via a terminal, not depicted, to acquire vehicle-generated data such as vehicle velocity data.

The content player 927 reproduces content from a storage medium (e.g., Compact Disc (CD) or Digital Versatile Disc (DVD)) inserted in the storage medium interface 928. The input device 929 may include a touch sensor for detecting touches on a screen of the display device 930, buttons, or switches that receive the operations or information input by a user. The display device 930 has a screen such as an LCD or an OLED display that displays images of the navigation function or images of reproduced content. The speakers 931 output sounds of the navigation function or sounds of reproduced content.

The wireless communication interface 933 performs wireless communication by supporting at least one of wireless LAN standards such as the IEEE 802.11a, 802.11b, 802.11g, 802.11n, 802.11ac, and 802.11ad. In infrastructure mode, the wireless communication interface 933 may communicate with another device via a wireless LAN access point. In direct communication mode such as ad-hoc mode or Wi-Fi Direct mode, the wireless communication interface 933 may communicate directly with another device. Typically, the wireless communication interface 933 may include a baseband processor, an RF circuit, and a power amplifier. The wireless communication interface 933 may be a one-chip module that integrates a memory for storing a communication control program, a processor for executing that program, and related circuits. In addition to the wireless LAN method, the wireless communication interface 933 may support other types of wireless communication methods such as near-field communication method, close proximity communication method, or cellular communication method. The antenna switch 934 switches multiple circuits which are included in the wireless communication interface 933 and to which the antenna 935 is connected. The antenna 935 has one or multiple antenna elements and is used to transmit and receive wireless signals via the wireless communication interface 933.

The example in FIG. 19 is not limitative of how the car navigation device 920 is configured. Alternatively, the car navigation device 920 may include multiple antennas. In such a case, the antenna switch 934 may be omitted from the configuration of the car navigation device 920.

The battery 938 supplies power to each of the blocks of the car navigation device 920 depicted in FIG. 19 via feeder lines partially indicated by broken lines in the drawing. The battery 938 also accumulates power fed from the vehicle side.

In the car navigation device 920 depicted in FIG. 19, the control section 240 explained above with reference to FIG. 2 may be implemented using the wireless communication interface 933. At least some of the functions may be implemented using the processor 921.

The wireless communication interface 933 may be allowed to operate as the above-described information processing device 100 or 101, providing wireless connection to the terminal possessed by the user riding in the vehicle.

The technology of the present disclosure may alternatively be implemented as an onboard system (or vehicle) 940 including at least one of the blocks of the above-described car navigation device 920, the onboard network 941, and an onboard module 942. The onboard module 942 generates vehicle-side data such as vehicle velocity, engine revolutions, or failure information, and outputs the generated data onto the onboard network 941.

3-3. Third Application

Figure 20:
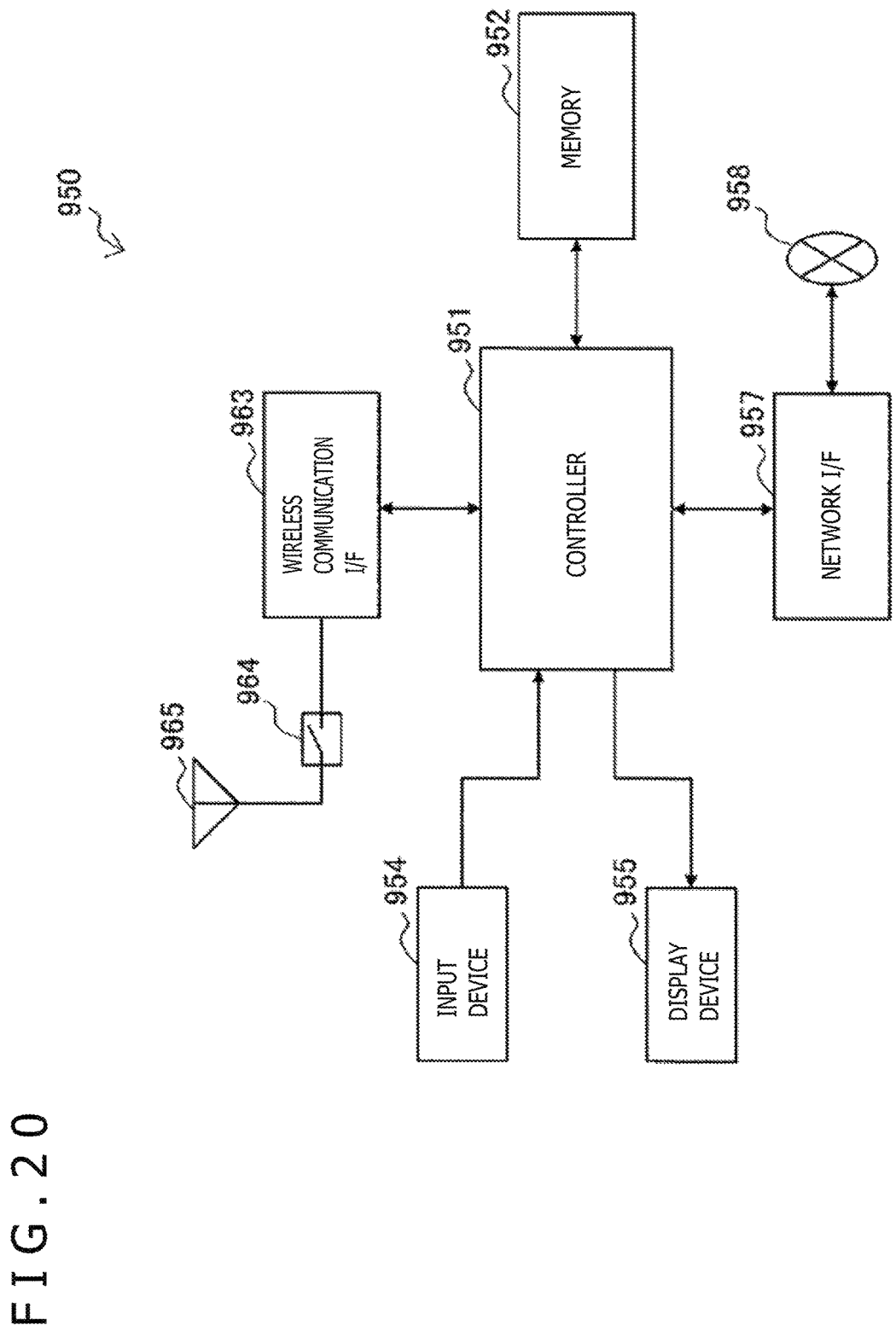
FIG. 20 is a block diagram depicting a typical schematic configuration of a wireless access point.

FIG. 20 is a block diagram depicting a typical schematic configuration of a wireless access point 950 to which the technology of the present disclosure may be applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), for example, which operates diverse functions on the Internet Protocol (IP) layer and higher layers (e.g., access restriction, routing, encryption, firewall, and log management) of the wireless access point 950. The memory 952 includes a RAM and a ROM, and stores programs to be executed by the controller 951 as well as various control data (e.g., terminal list, routing table, encryption keys, security settings, and logs).

The input device 954 includes buttons or switches, for example, which receive the operations by a user. The display device 955 includes light-emitting diode (LED) lamps, and displays the operation status of the wireless access point 950.

The network interface 957 is a wired communication interface for connecting the wireless access point 950 with a wired communication network 958. The network interface 957 may have multiple connection terminals. The wired communication network 958 may be a LAN such as the Ethernet (registered trademark) or a wide area network (WAN).

The wireless communication interface 963 supports at least one of wireless LAN standards such as the IEEE 802.11a, 802.11b, 802.11g, 802.11n, 802.11ac, and 802.11ad, working as an access point that provides wireless connection to nearby terminals. Typically, the wireless communication interface 963 may include a baseband processor, an RF circuit, and a power amplifier. The wireless communication interface 963 may be a one-chip module that integrates a memory for storing a communication control program, a processor for executing that program, and related circuits. The antenna switch 964 switches multiple circuits which are included in the wireless communication interface 963 and to which the antenna 965 is connected. The antenna 965 has one or multiple antenna elements and is used to transmit and receive wireless signals via the wireless communication interface 963.

In the wireless access point 950 depicted in FIG. 20, the control section 240 explained above with reference to FIG. 2 may be implemented using the wireless communication interface 963. At least some of the functions may be implemented using the controller 951.

The embodiments described above are merely examples in which the present technology may be implemented. The particulars of the embodiments correspond basically to the inventive matters claimed in the appended claims. Likewise, the inventive matters named in the appended claims correspond basically to the particulars of the embodiments with the same names in the foregoing description of the preferred embodiments of the present technology. However, these embodiments are not limitative of the present technology that may also be implemented using various modifications and alterations of the embodiments so far as they are within the scope of the appended claims.

The procedures discussed above in connection with the embodiments may be construed as constituting a method having a series of such procedures. Also, the procedures may be construed as forming a program for causing a computer to execute a series of such procedures, or as constituting a recording medium storing such a program. The recording medium may be a CD, a MiniDisc (MD), a DVD, a memory card, or a Blu-ray Disc (registered trademark), for example.

The advantageous effects stated in this description are only examples and not limitative of the present technology that may also provide other advantages.

The present technology may be configured preferably as follows:

(1)

An information processing device including: a wireless communication section configured to communicate wirelessly with another information processing device using one or multiple channels; and a control section configured to perform control to notify the other information processing device of channel information for identifying a channel for use in the wireless communication.

(2)

The information processing device as stated in paragraph (1) above, in which the wireless communication section performs the wireless communication with the other information processing device using channel bonding under the IEEE 802.11 standard.

(3)

The information processing device as stated in paragraph (1) or (2) above, in which the control section performs control to transmit a request-to-send frame including the channel information.

(4)

The information processing device as stated in paragraph (3) above, in which the control section performs control to transmit the request-to-send frame on the channel identified by the channel information.

(5)

The information processing device as stated in paragraph (4) above, in which the control section performs control to use for the wireless communication a channel used for receiving a clear-to-send frame with regard to the request-to-send frame.

(6)

The information processing device as stated in paragraph (1) or (2) above, in which the control section performs control to transmit a clear-to-send frame including the channel information.

(7)

The information processing device as stated in paragraph (6) above, in which the control section performs control to transmit the clear-to-send frame on the channel identified by the channel information.

(8)

The information processing device as stated in any one of paragraphs (1) to (7) above, in which the channel information is bit map information indicative of relations of correspondence between multiple channels available for the wireless communication section on the one hand and channels for use in the wireless communication on the other hand.

(9)

An information processing device including: a wireless communication section configured to communicate wirelessly with another information processing device using one or multiple channels; and a control section configured to perform control to set a channel for use in the wireless communication on the basis of a notification from the other information processing device.

(10)

The information processing device as stated in paragraph (9) above, in which the control section sets one or multiple channels as monitor target channels for use in monitoring signals, and upon receipt of a request-to-send frame including channel information for identifying a channel requested for use in the wireless communication, the control section sets a channel for use in the wireless communication on the basis of a comparison between the channel identified by the channel information and the monitor target channels.

(11)

The information processing device as stated in paragraph (9) or (10) above, in which the control section sets a channel for use in the wireless communication on the basis of a remaining battery level and a received signal strength of the information processing device.

(12)

A communication system including: a first information processing device including a wireless communication section configured to communicate wirelessly with a second information processing device using one or multiple channels, and a control section configured to perform control to notify the second information processing device of channel information for identifying a channel for use in the wireless communication; and a second information processing device including a wireless communication section configured to communicate wirelessly with the first information processing device using one or multiple channels, and a control section configured to perform control to set a channel for use in the wireless communication on the basis of the notification from the first information processing device.

(13)

An information processing method including: a first procedure for providing wireless communication with another information processing device using one or multiple channels; and a second procedure for notifying the other information processing device of channel information for identifying a channel for use in the wireless communication.

(14)

An information processing method including: a first procedure for providing wireless communication with another information processing device using one or multiple channels; and a second procedure for setting a channel for use in the wireless communication on the basis of a notification from the other information processing device.

(15)

A program for causing a computer to execute: a first procedure for providing wireless communication with another information processing device using one or multiple channels; and a second procedure for notifying the other information processing device of channel information for identifying a channel for use in the wireless communication.

(16)

A program for causing a computer to execute: a first procedure for providing wireless communication with another information processing device using one or multiple channels; and a second procedure for setting a channel for use in the wireless communication on the basis of a notification from the other information processing device.

REFERENCE SIGNS LIST

10 Communication system
100, 101 Information processing device (master station)
200 to 202 Information processing device (slave station)
210 Wireless communication section
220 Storage section
230 Power management section
240 Control section
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensors
926 Data interface
927 Content player
928 Storage medium interface
929 Input device
930 Display device
931 Speaker
933 Wireless communication interface
934 Antenna switch
935 Antenna
938 Battery
941 Onboard network
942 Onboard module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device comprising:
a wireless communication section configured to communicate wirelessly with another information processing device using one or a plurality of channels; and
circuitry configured to:
perform control to notify the other information processing device of channel information for identifying one or more channels for use in the wireless communication, perform control to transmit a request-to-send frame including the channel information, and perform control to use, for the wireless communication, a channel that received a clear-to-send frame with regard to the request-to-send frame, wherein the other information processing device set the channel on the basis of a remaining battery level, a number of a plurality of remaining battery level thresholds, a received signal strength of the information processing device, and a number of a plurality of received signal strength thresholds, wherein a number of the one or a plurality of channels is N, the number of the plurality of remaining battery level thresholds is N−1, and the number of the plurality of received signal strength thresholds is N−1.

2. The information processing device according to claim 1, wherein the wireless communication section performs the wireless communication with the other information processing device using channel bonding under the IEEE 802.11 standard.

3. The information processing device according to claim 1, wherein the circuitry is configured to perform control to transmit the request-to-send frame on the channel identified by the channel information.

4. The information processing device according to claim 1, wherein the channel information is bit map information indicative of relations of correspondence between a plurality of channels available for the wireless communication section on the one hand and channels for use in the wireless communication on the other hand.

5. An information processing device comprising:
a wireless communication section configured to communicate wirelessly with another information processing device using one or a plurality of channels; and
circuitry configured to:
perform control to set a channel for use in the wireless communication on the basis of a notification from the other information processing device, and
set the channel for use in the wireless communication on the basis of a remaining battery level, a number of a plurality of remaining battery level thresholds, a received signal strength of the information processing device, and a number of a plurality of received signal strength thresholds,
wherein a number of the one or a plurality of channels is N, the number of the plurality of remaining battery level thresholds is N−1, and the number of the plurality of received signal strength thresholds is N−1.

6. The information processing device according to claim 5, wherein the circuitry is configured to:
set one or more channels as monitor target channels for use in monitoring signals, and
upon receipt of a request-to-send frame including channel information for identifying a requested channel requested for use in the wireless communication, set the channel for use in the wireless communication on the basis of a comparison between the requested channel identified by the channel information and the monitor target channels.

7. A communication system comprising:
a first information processing device including:
a wireless communication section configured to communicate wirelessly with a second information processing device using one or a plurality of channels, and
circuitry configured to perform control to notify the second information processing device of channel information for identifying one or more channels for use in the wireless communication; and
a second information processing device including:
a wireless communication section configured to communicate wirelessly with the first information processing device using the one or a plurality of channels, and
circuitry configured to
perform control to set a channel for use in the wireless communication on the basis of the notification from the first information processing device, and
set the channel for use in the wireless communication on the basis of a remaining battery levels, a number of a plurality of remaining battery level threshold, a received signal strength of the information processing device, and a number of a plurality of received signal strength thresholds,
wherein a number of the one or a plurality of channels is N, the number of the plurality of remaining battery level thresholds is N−1, and the number of the plurality of received signal strength thresholds is N−1.

* * * * *